(12) United States Patent
Steendam et al.

(10) Patent No.: US 9,193,864 B2
(45) Date of Patent: Nov. 24, 2015

(54) POLYCARBONATE COMPOSITIONS WITH IMPROVED IMPACT RESISTANCE

(75) Inventors: Wilhelmus Johannes Daniel Steendam, Bergen op Zoom (NL); Robert Puyenbroek, Zwolle (NL); Bernardus Johannes Paulus Jansen, Bergen op Zoom (NL)

(73) Assignee: SABIC Global Technologies B.V., Bergen op Zoom (NL)

( * ) Notice: Subject to any disclaimer, the term of this patent is extended or adjusted under 35 U.S.C. 154(b) by 533 days.

(21) Appl. No.: 13/530,985

(22) Filed: Jun. 22, 2012

(65) Prior Publication Data

US 2013/0345347 A1 Dec. 26, 2013

(51) Int. Cl.
*C08L 69/00* (2006.01)
*C08G 64/04* (2006.01)

(52) U.S. Cl.
CPC ................. *C08L 69/00* (2013.01); *C08G 64/04* (2013.01)

(58) Field of Classification Search
CPC .... C08G 64/16; C08G 64/04; C08G 64/1691; C08L 69/00
USPC ........................................................ 524/537
See application file for complete search history.

(56) References Cited

U.S. PATENT DOCUMENTS

| | | | |
|---|---|---|---|
| 4,746,701 A | 5/1988 | Kress et al. | |
| 6,140,422 A | 10/2000 | Khanarian et al. | |
| 7,138,479 B2 | 11/2006 | Dhara et al. | |
| 7,498,401 B2 | 3/2009 | Agarwal | |
| 7,659,359 B1 | 2/2010 | Assink et al. | |
| 7,786,246 B2 | 8/2010 | Jansen et al. | |
| 7,858,728 B2 | 12/2010 | Brack et al. | |
| 1,007,737 A1 | 3/2011 | Brack et al. | |
| 2005/0143554 A1 | 6/2005 | Dhara et al. | |
| 2005/0234211 A1 | 10/2005 | Martinez et al. | |
| 2007/0135569 A1 | 6/2007 | DeRudder | |
| 2008/0033108 A1 | 2/2008 | Kung et al. | |
| 2009/0105393 A1 | 4/2009 | Jansen et al. | |
| 2009/0105438 A1* | 4/2009 | Brack et al. ................... | 526/314 |
| 2009/0105444 A1 | 4/2009 | Chatterjee et al. | |
| 2009/0124749 A1* | 5/2009 | Steendam et al. ............ | 524/502 |
| 2009/0286952 A1 | 11/2009 | Brack et al. | |
| 2009/0312503 A1 | 12/2009 | Brack et al. | |
| 2010/0076130 A1 | 3/2010 | Miyake et al. | |
| 2010/0081739 A1* | 4/2010 | Warth et al. ..................... | 524/86 |
| 2010/0081784 A1 | 4/2010 | Brack et al. | |
| 2010/0099832 A1 | 4/2010 | Jansen et al. | |
| 2010/0160563 A1 | 6/2010 | Miyake et al. | |
| 2010/0179286 A1 | 7/2010 | Oda et al. | |
| 2010/0184884 A1 | 7/2010 | Miyake et al. | |

FOREIGN PATENT DOCUMENTS

WO WO-2009050683 A2 4/2009

OTHER PUBLICATIONS

Arakawa, "ARKON M-100," product data sheet, 2000, pp. 1.
Arakawa, "ARKON M-115," product data sheet, 2005, pp. 1.
Arakawa, "ARKON M-90," product data sheet, 2000, pp. 1.
Arakawa, "ARKON P-100," product data sheet, 2000, pp. 1.
Arakawa, "ARKON P-115," product data sheet, 2000, pp. 1.
Arakawa, "ARKON P-125," product data sheet, 2000, pp. 1.
Arakawa, "ARKON P-140," product data sheet, 2000, pp. 1.
Arakawa, "ARKON P-90," product data sheet, 2000, pp. 1.
Ciba Specialty Chemicals, "Ciba IRGAFOS 168 Processing Stabiliser," product information, 2005, pp. 1-3.

* cited by examiner

*Primary Examiner* — Michael Pepitone
(74) *Attorney, Agent, or Firm* — Baker Hostetler LLP

(57) ABSTRACT

The present disclosure relates to thermoplastic polycarbonate compositions comprising a first polycarbonate component, a second polycarbonate component comprising an isosorbide/resorcinol/bisphenol-A polycarbonate terpolymer, and at least one impact modifier. The disclosed compositions have, among other characteristics, improved Notched Izod Impact strength, tensile modulus, tensile strength, and multi-axial impact strength. This abstract is intended as a scanning tool for purposes of searching in the particular art and is not intended to be limiting of the present invention.

29 Claims, No Drawings

POLYCARBONATE COMPOSITIONS WITH IMPROVED IMPACT RESISTANCE

FIELD OF INVENTION

The present disclosure relates to polycarbonate compositions, and specifically to impact modified polycarbonate compositions comprising an isosorbide-resorcinol-bisphenol A polycarbonate terpolymer and having increased ductility, strength, and modulus.

BACKGROUND

Impact modified polycarbonate compositions, including for example, polycarbonate compositions comprising acrylonitrile-butadiene-styrene (ABS) are of great interest in the plastics industry due to their relative ease of processing with low-temperature ductility. Such polycarbonate blends are also known for their high impact and heat resistance; however, for many applications the impact resistant of such blends is still not sufficient. What is needed in some instances are polymeric blends with even a further increase in impact resistance over conventional impact modified polycarbonate compositions. This need and other needs are satisfied by the compositions and methods of the present disclosure.

SUMMARY OF THE INVENTION

In accordance with the purpose(s) of the invention, as embodied and broadly described herein, this disclosure, in one aspect, relates to polycarbonate compositions, and specifically to impact modified polycarbonate compositions comprising an isosorbide-resorcinol-bisphenol A polycarbonate terpolymer and having increased ductility, strength, and modulus.

Disclosed are polycarbonate compositions comprising: a) a first polycarbonate component, wherein the first polycarbonate component comprises a polycarbonate terpolymer comprising monomer units of isosorbide, bisphenol A, and resorcinol; b) an optional second polycarbonate component, wherein the second polycarbonate component comprises a polycarbonate polymer comprising monomer units of bisphenol A; and c) at least one impact modifier component.

Also disclosed are polycarbonate compositions comprising: a) a polycarbonate component comprising an isosorbide/resorcinol/bisphenol-A polycarbonate terpolymer, wherein the isosorbide/resorcinol/bisphenol-A polycarbonate terpolymer has a respective molar weight ratio of about 50(isosorbide)/25(resorcinol)/25(bisphenol-A), and wherein the isosorbide/resorcinol/bisphenol-A polycarbonate terpolymer is present in the composition in an amount from greater than 35 wt % to about 60 wt % of the composition; b) an acrylonitrile-butadiene-styrene polymer, wherein the acrylonitrile-butadiene-stryene polymer is present in the composition in an amount from greater than 0 to 20 wt %; and c) a polymethylmethacrylate, wherein the polymethylmethacrylate is present in the composition in an amount from greater than 0 to 25 wt %.

Also disclosed are polycarbonate compositions comprising: a) a polycarbonate component comprising an isosorbide/resorcinol/bisphenol-A polycarbonate terpolymer, wherein the isosorbide/resorcinol/bisphenol-A polycarbonate terpolymer has a respective molar weight ratio of about 50(isosorbide)/25(resorcinol)/25(bisphenol-A), wherein the isosorbide/resorcinol/bisphenol-A polycarbonate terpolymer is present in the composition in an amount from greater than 35 wt % to about 60 wt % of the composition; b) an acrylonitrile-butadiene-styrene polymer, wherein the acrylonitrile-butadiene-stryene polymer is present in the composition in an amount from greater than 0 to 20 wt %; and c) a polylactic acid, wherein the polylactic acid is present in the composition in an amount from greater than 0 to 25 wt %.

Also disclosed are methods of increasing the Notched Izod Impact strength of a conventional polycarbonate composition comprising an acrylonitrile-butadiene-styrene polymer component and a relatively high-ductility polycarbonate polymer component, the method comprising substituting at least a portion of the high-ductility polycarbonate polymer component in a composition with an isorbide/resorcinol/bisphenol-A polycarbonate terpolymer.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited.

DEFINITIONS

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, example methods and materials are now described.

As used in the specification and the appended claims, the singular forms "a," "an" and "the" include plural referents unless the context clearly dictates otherwise. Thus, for example, reference to "a polycarbonate" includes mixtures of two or more polycarbonates.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that the subsequently described event or circumstance can or can not occur, and that the description includes instances where said event or circumstance occurs and instances where it does not. For example, the phrase "optional second polycarbonate component" means that the second polycarbonate component may or may not be present and that the description includes instances where the second polycarbonate component is present and where the second polycarbonate component is not present.

Disclosed are various component materials used to prepare various compositions of the invention. Also disclosed are the compositions themselves and methods of manufacture and use of the disclosed compositions. It is understood that when combinations, subsets, interactions, groups, etc. of these materials are disclosed that while specific reference of each various individual and collective combinations and permutation of these components can not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A wt % of a component, unless specifically stated to the contrary, is based on the total weight of the formulation or composition in which the component is included. For example if a particular element or component in a composition or article is said to have 8% weight, it is understood that this percentage is relation to a total compositional percentage of 100%.

The term "alkyl group" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "alkoxy" as used herein is an alkyl group bound through a single, terminal ether linkage; that is, an "alkoxy" group can be defined as —OR where R is alkyl as defined above. A "lower alkoxy" group is an alkoxy group containing from one to six carbon atoms.

The term "alkenyl group" as used herein is a hydrocarbon group of from 2 to 24 carbon atoms and structural formula containing at least one carbon-carbon double bond. Asymmetric structures such as (AB)C=C(CD) are intended to include both the E and Z isomers. This can be presumed in structural formulae herein wherein an asymmetric alkene is present, or it can be explicitly indicated by the bond symbol C.

The term "alkynyl group" as used herein is a hydrocarbon group of 2 to 24 carbon atoms and a structural formula containing at least one carbon-carbon triple bond.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "cycloalkyl group" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl group" is a cycloalkyl group as defined above where at least one of the carbon atoms of the ring is substituted with a heteroatom such as, but not limited to, nitrogen, oxygen, sulphur, or phosphorus.

The term "aralkyl" as used herein is an aryl group having an alkyl, alkynyl, or alkenyl group as defined above attached to the aromatic group. An example of an aralkyl group is a benzyl group.

The term "hydroxyalkyl group" as used herein is an alkyl, alkenyl, alkynyl, aryl, aralkyl, cycloalkyl, halogenated alkyl, or heterocycloalkyl group described above that has at least one hydrogen atom substituted with a hydroxyl group.

The term "alkoxyalkyl group" is defined as an alkyl, alkenyl, alkynyl, aryl, aralkyl, cycloalkyl, halogenated alkyl, or heterocycloalkyl group described above that has at least one hydrogen atom substituted with an alkoxy group described above.

The term "ester" as used herein is represented by the formula —C(O)OA, where A can be an alkyl, halogenated alkyl, alkenyl, alkynyl, aryl, heteroaryl, cycloalkyl, cycloalkenyl, heterocycloalkyl, or heterocycloalkenyl group described above.

The term "carbonate group" as used herein is represented by the formula —OC(O)OR, where R can be hydrogen, an alkyl, alkenyl, alkynyl, aryl, aralkyl, cycloalkyl, halogenated alkyl, or heterocyclalkyl group described above.

The term "carboxylic acid" as used herein is represented by the formula —C(O)OH.

The term "aldehyde" as used herein is represented by the formula —C(O)H.

The term "keto group" as used herein is represented by the formula —C(O)R, where R is an alkyl, alkenyl, alkynyl, aryl, aralkyl, cycloalkyl, halogenated alkyl, or heterocyclalkyl group described above.

The term "carbonyl group" as used herein is represented by the formula C=O.

The term "ether" as used herein is represented by the formula $AOA^1$, where A and $A^1$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "sulfo-oxo group" as used herein is represented by the formulas —S(O)$_2$R, —OS(O)$_2$R, or, —OS(O)$_2$OR, where R can be hydrogen, an alkyl, alkenyl, alkynyl, aryl, aralkyl, cycloalkyl, halogenated alkyl, or heterocyclalkyl group described above.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

Polycarbonate Compositions

As briefly summarized above, in one aspect the present disclosure provides impact modified polycarbonate compositions comprising an isosorbide-resorcinol-bisphenol A polycarbonate terpolymer. These polycarbonate compositions exhibit improved ductility, impact, tensile modulus, and/or tensile strength relative to conventional polycarbonate compositions that do not contain the isosorbide-resorcinol-bisphenol A polycarbonate terpolymer. Thus, in various aspects, the inventive polymer system exhibits at least one of improved ductility, improved tensile modulus, improved tensile strength, or improved impact. In one aspect, disclosed are polycarbonate compositions comprising polycarbonate/ABS wherein the polycarbonate has been partially or completely replaced with Isosorbide/Resorcinol/bisphenol A. In a further aspect, disclosed are polycarbonate compositions comprising a polycarbonate/ABS wherein the polycarbonate has been partially or completely replaced with Isosorbide/Resorcinol/bisphenol A and Poly (methyl methacrylate) (PMMA) is partially or completely replaced with poly lactic acid (PLA).

Moreover, because in some aspects the disclosed compositions show improved ductility, impact, tensile modulus, and/or tensile strength relative to conventional polycarbonate compositions that do not contain the terpolymer, disclosed herein are methods of increasing the impact properties of a polycarbonate composition provided by conventional polycarbonate compositions. For example, disclosed are methods comprising substituting all or a portion of a conventional polycarbonate with high ductility (e.g., a polycarbonate polymer with an impact score of about 56.69 kJ·m$^2$) with a more brittle terpolymer (i.e., having an Notched Izod impact, "NII," score below that of the polycarbonate it is replacing), such as, for example, an isosorbide-resorcinol-bisphenol A polycarbonate terpolymer (e.g. an isosorbide-resorcinol-bisphenol A copolymer with a NII of 5.27 kJ·m2).

In various aspects, the invention provides a polycarbonate composition comprising:

a. a first polycarbonate component; wherein the first polycarbonate component is a polycarbonate terpolymer comprising monomer units of isosorbide, bisphenol A, and resorcinol;

b. an optional second polycarbonate component; wherein the second polycarbonate component is a polycarbonate polymer comprising monomer units of bisphenol A; and c. at least one impact modifier component.

According to aspects of the invention, the first polycarbonate component can be present in the composition in an amount from greater than about 0 wt % to about 60 wt % of the composition. In a still further aspect, the first polycarbonate component is present in the composition in an amount from about 35 wt % to about 60 wt % of the composition. In a yet further aspect, the first polycarbonate component is present in the composition in an amount from about 45 wt % to about 60 wt % of the composition. In an even further aspect, the first polycarbonate component is present in the composition in an amount from about 30 wt % to about 40 wt % of the composition. In a still further aspect, the first polycarbonate component is present in the composition in an amount from about 37 wt % to about 40 wt % of the composition. In a yet further aspect, the first polycarbonate component is present in the composition in an amount from about 50 wt % to about 60 wt % of the composition. In an even further aspect, the first polycarbonate component is present in the composition in an amount from about 55 wt % to about 60 wt % of the composition. In a still further aspect, the first polycarbonate component is present in the composition in an amount from about 55 wt % to about 57 wt % of the composition. In an even further aspect, the first polycarbonate component is present in the composition in an amount of about 38 wt %. In a still further aspect, the first polycarbonate component is present in the composition in an amount of about 49.6 wt %. In a yet further aspect, the first polycarbonate component is present in the composition in an amount of about 56.7 wt %.

The polycarbonate terpolymer comprises repeating monomer units of isosorbide, bisphenol A, and resorcinol. According to some aspects, the terpolymer can be characterized as having respective molar weight ratios of about 25 mol % to about 75 mol % of isosorbide monomer units; about 10 mol % to about 50 mol % of resorcinol monomer units; and about 10 mol % to about 50 mol % of bisphenol A monomer units, wherein the mol % of isosorbide monomer units, resorcinol monomer units, and bisphenol A monomer units combined is 100 mol %.

In alternative aspects, the terpolymer can be characterized as having respective molar weight ratios of about 40 mol % to about 60 mol % of isosorbide monomer units; about 15 mol % to about 35 mol % of resorcinol monomer units; and about 15 mol % to about 35 mol % of bisphenol A monomer units, wherein the mol % of isosorbide monomer units, resorcinol monomer units, and bisphenol A monomer units combined is 100 mol %.

In a further aspect, the terpolymer can be characterized as having respective molar weight ratios of about 45 mol % to about 55 mol % of isosorbide monomer units; about 20 mol % to about 30 mol % of resorcinol monomer units; and about 20 mol % to about 30 mol % of bisphenol A monomer units, wherein the mol % of isosorbide monomer units, resorcinol monomer units, and bisphenol A monomer units combined is 100 mol %.

In a further aspect, the terpolymer can be characterized as having respective molar weight ratios of about 47 mol % to about 52 mol % of isosorbide monomer units; about 22 mol % to about 27 mol % of resorcinol monomer units; and about 22 mol % to about 27 mol % of bisphenol A monomer units, wherein the mol % of isosorbide monomer units, resorcinol monomer units, and bisphenol A monomer units combined is 100 mol %.

In a still further aspect, the terpolymer can be characterized as having respective molar weight ratios of about 50 mol % of isosorbide monomer units; about 25 mol % of resorcinol monomer units; and about 25 mol % of bisphenol A monomer units; wherein the mol % of isosorbide monomer units, resorcinol monomer units, and bisphenol A monomer units combined is 100 mol %.

According to aspects of the invention, the optional second polycarbonate component can be present in an amount of from greater than 0 wt % to about 20 wt % of the composition. In a still further aspect, the second polycarbonate component is present in an amount of from greater than 0 wt % to about 10 wt % of the composition. In a yet further aspect, the second polycarbonate component is present in an amount of from greater than 0 wt % to about 8 wt % of the composition. In an even further aspect, the second polycarbonate component is not present.

In still a further aspect, the composition further comprises a third polycarbonate component. The third polycarbonate component can comprise a polycarbonate homopolymer of bisphenol A. In a yet further aspect, the third polycarbonate component is present in the composition in an amount from greater than about 0 wt % to about 20 wt % of the composition. In an even further aspect, the third polycarbonate component is present in an amount from greater than about 0 wt % to about 10 wt % of the composition.

In a further aspect, the third polycarbonate component is a low flow polycarbonate polymer. In a still further aspect, the third polycarbonate component has a melt volume flow rate ("MVR") of about 5.0 to about 10 g/10 min, wherein MVR is determined measured at 300° C. under a load of 1.2 kg. In a yet further aspect, the third polycarbonate component has a MVR of about 5.1 to about 6.9 g/10 min.

In a further aspect, the at least one impact modifier component comprises acrylonitrile-butadiene-styrene ("ABS") copolymer. In a still further aspect, the ABS copolymer has a polybutadiene content of about 40 wt % to about 80 wt %. In a yet further aspect, the ABS copolymer has a polybutadiene content of about 40 wt % to about 60 wt %. In an even further aspect, the ABS copolymer has a polybutadiene content of about 45 wt % to about 55 wt %. In a still further aspect, the ABS copolymer has a polybutadiene content of about 48 wt % to about 52 wt %. In a yet further aspect, the ABS copolymer has a polybutadiene content of about 52 wt %.

In a further aspect, the ABS copolymer comprises about 5 wt % to about 20 wt % of the composition. In a still further aspect, the ABS copolymer comprises about 10 wt % to about 17 wt % of the composition. In a yet further aspect, the ABS copolymer comprises about 12 wt % to about 15 wt % of the composition. In an even further aspect, the ABS copolymer comprises about 14 wt % of the composition.

In a further aspect, the composition further comprises a polyacrylate. In a still further aspect, the polyacrylate is a polymethylmethacrylate ("PMMA"). In a yet further aspect, the PMMA comprises about 10 wt % to about 30 wt % of the composition. In an even further aspect, the PMMA comprises about 15 wt % to about 25 wt % of the composition. In a still further aspect, the PMMA comprises about 17 wt % to about 23 wt % of the composition. In a yet further aspect, the PMMA comprises about 21 wt % of the composition.

In a further aspect, the composition further comprises polylactic acid ("PLA"). In a still further aspect, the PLA comprises about 10 wt % to about 30 wt % of the composition. In a yet further aspect, the PLA comprises about 15 wt % to about 25 wt % of the composition. In an even further aspect, the PLA comprises about 17 wt % to about 23 wt % of the composition. In a still further aspect, the PLA comprises about 21 wt % of the composition.

In a further aspect, the composition further comprises polylactic acid ("PLA") and a poly acrylate. In a still further aspect, the composition further comprises polylactic acid ("PLA") and a poly acrylate, wherein the polyacrylate is a polymethylmethacrylate ("PMMA"). In a yet further aspect, the PLA and PMMA together comprise about 10 wt % to about 30 wt % of the composition. In a yet further aspect, the PLA and PMMA together comprise about 15 wt % to about 25 wt % of the composition. In an even further aspect, the PLA and PMMA together comprise about 17 wt % to about 23 wt % of the composition. In a still further aspect, the PLA and PMMA together comprise about 21 wt % of the composition.

In a further aspect, the composition further comprises a polycarbonate-polysiloxane copolymer. In a still further aspect, the polycarbonate-polysiloxane copolymer comprises monomer units derived from bisphenol A. In a yet further aspect, the polycarbonate-polysiloxane copolymer comprises monomer units derived from dimethylsiloxane. In an even further aspect, the polycarbonate-polysiloxane copolymer comprises monomer units derived from bisphenol A and dimethylsiloxane.

In a further aspect, the polycarbonate-polysiloxane copolymer is present in an amount from about 1 wt % to about 20 wt %. In a yet further aspect, the polycarbonate-polysiloxane copolymer is present in an amount from about 5 wt % to about 15 wt %. In an even further aspect, the polycarbonate-polysiloxane copolymer is present in an amount from about 5 wt % to about 10 wt %. In a still further aspect, the polycarbonate-polysiloxane copolymer is present in an amount from about 6 wt % to about 8 wt %. In a yet further aspect, the polycarbonate-polysiloxane copolymer is present in an amount of about 7.5 wt %.

In a further aspect, the composition further comprises one or more additional components selected from a flow promoter, a plasticizer or mold release agent, a primary antioxidant, and a secondary antioxidant.

In a further aspect, the composition further comprises a primary antioxidant. In a still further aspect, the primary antioxidant is a hindered phenol. In a yet further aspect, the primary antioxidant is a 3-(3',5'-di-tert-butyl-4'-hydroxyphenyl)propionic acid stearyl ester.

In a further aspect, the primary antioxidant is present in an amount from about 0.05 wt % to about 0.7 wt %. In a still further aspect, the primary antioxidant is present in an amount from about 0.05 wt % to about 0.5 wt %. In a yet further aspect, the primary antioxidant is present in an amount from about 0.1 wt % to about 0.5 wt %. In an even further aspect, the primary antioxidant is present in an amount from about 0.1 wt % to about 0.4 wt %. In a still further aspect, the primary antioxidant is present in an amount from about 0.09 wt % to about 0.11 wt %. In a yet further aspect, the primary antioxidant is present in an amount of about 0.08 wt %. In an even further aspect, the primary antioxidant is present in an amount of about 0.09 wt %. In a still further aspect, the primary antioxidant is present in an amount of about 0.10 wt %. In a yet further aspect, the primary antioxidant is present in an amount of about 0.11 wt %. In an even further aspect, the primary antioxidant is present in an amount of about 0.12 wt %. In a still further aspect, the primary antioxidant is present in an amount from about 0.2 wt % to about 0.5 wt %. In a yet further aspect, the primary antioxidant is present in an amount of about 0.34 wt %. In an even further aspect, the primary antioxidant is present in an amount of about 0.36 wt %. In a still further aspect, the primary antioxidant is present in an amount of about 0.38 wt %. In a yet further aspect, the primary antioxidant is present in an amount of about 0.40 wt %. In an even further aspect, the primary antioxidant is present in an amount of about 0.42 wt %.

In a further aspect, the 3-(3',5'-di-tert-Butyl-4'-hydroxyphenyl)propionic acid stearyl ester is present in an amount from about 0.05 wt % to about 0.7 wt %. In a still further aspect, the 3-(3',5'-di-tert-Butyl-4'-hydroxyphenyl)propionic acid stearyl ester is present in an amount from about 0.05 wt % to about 0.5 wt %. In a yet further aspect, the 3-(3',5'-di-tert-Butyl-4'-hydroxyphenyl)propionic acid stearyl ester is present in an amount from about 0.1 wt % to about 0.5 wt %. In an even further aspect, the 3-(3',5'-di-tert-Butyl-4'-hydroxyphenyl)propionic acid stearyl ester is present in an amount from about 0.1 wt % to about 0.4 wt %. In a still further aspect, the 3-(3',5'-di-tert-Butyl-4'-hydroxyphenyl)propionic acid stearyl ester is present in an amount from about 0.09 wt % to about 0.11 wt %. In a yet further aspect, the 3-(3',5'-di-tert-Butyl-4'-hydroxyphenyl)propionic acid stearyl ester is present in an amount of about 0.08 wt %. In an even further aspect, the 3-(3',5'-di-tert-Butyl-4'-hydroxyphenyl)propionic acid stearyl ester is present in an amount of about 0.09 wt %. In a still further aspect, the 3-(3',5'-di-tert-Butyl-4'-hydroxyphenyl)propionic acid stearyl ester is present in an amount of about 0.10 wt %. In a yet further aspect, the 3-(3',5'-di-tert-Butyl-4'-hydroxyphenyl)propionic acid stearyl ester is present in an amount of about 0.11 wt %. In an even further aspect, the 3-(3',5'-di-tert-Butyl-4'-hydroxyphenyl)propionic acid stearyl ester is present in an amount of about 0.12 wt %. In a still further aspect, the 3-(3',5'-di-tert-Butyl-4'-hydroxyphenyl)propionic acid stearyl ester is present in an amount from about 0.2 wt % to about 0.5 wt %. In a yet further aspect, the 3-(3',5'-di-tert-Butyl-4'-hydroxyphenyl)propionic acid stearyl ester is present in an amount of about 0.34 wt %. In an even further aspect, the 3-(3',5'-di-tert-Butyl-4'-hydroxyphenyl)propionic acid stearyl ester is present in an amount of about 0.36 wt %. In a still further aspect, the 3-(3',5'-di-tert-Butyl-4'-hydroxyphenyl)propionic acid stearyl ester is present in an amount of about 0.38 wt %. In a yet further aspect, the 3-(3',5'-di-tert-Butyl-4'-hydroxyphenyl)propionic acid stearyl ester is present in an amount of about 0.40 wt %. In an even further aspect, the 3-(3',5'-di-tert-Butyl-4'-hydroxyphenyl)propionic acid stearyl ester is present in an amount of about 0.42 wt %.

In a further aspect, the composition comprises a secondary antioxidant. In a still further aspect, the secondary antioxidant is a trisarylphosphite. In a yet further aspect, the secondary antioxidant is tris(2,4-di-tert-butylphenyl)phosphite.

In a further aspect, the secondary antioxidant is present in an amount from about 0.01 wt % to about 0.2 wt %. In a still further aspect, the secondary antioxidant is present in an amount from about 0.05 wt % to about 0.2 wt %. In a yet further aspect, the secondary antioxidant is present in an amount from about 0.05 wt % to about 0.15 wt %. In an even further aspect, the secondary antioxidant is present in an amount from about 0.07 wt % to about 0.12 wt %. In a still further aspect, the secondary antioxidant is present in an amount from about 0.09 wt % to about 0.11 wt %. In a yet further aspect, the secondary antioxidant is present in an amount of about 0.08 wt %. In an even further aspect, the secondary antioxidant is present in an amount of about 0.09 wt %. In a still further aspect, the secondary antioxidant is present in an amount of about 0.10 wt %. In a yet further aspect, the secondary antioxidant is present in an amount of about 0.11 wt %. In an even further aspect, the secondary antioxidant is present in an amount of about 0.12 wt %.

In a further aspect, the tris(2,4-di-tert-butylphenyl)phosphite is present in an amount from about 0.01 wt % to about 0.2 wt %. In a still further aspect, the tris(2,4-di-tert-butylphenyl)phosphite is present in an amount from about 0.05 wt % to about 0.2 wt %. In a yet further aspect, the tris(2,4-di-tert-butylphenyl)phosphite is present in an amount from about 0.05 wt % to about 0.15 wt %. In an even further aspect, the tris(2,4-di-tert-butylphenyl)phosphite is present in an amount from about 0.07 wt % to about 0.12 wt %. In a still further aspect, the tris(2,4-di-tert-butylphenyl)phosphite is present in an amount from about 0.09 wt % to about 0.11 wt %. In a yet further aspect, the tris(2,4-di-tert-butylphenyl)phosphite is present in an amount of about 0.08 wt %. In an even further aspect, the tris(2,4-di-tert-butylphenyl)phosphite is present in an amount of about 0.09 wt %. In a still further aspect, the tris(2,4-di-tert-butylphenyl)phosphite is present in an amount of about 0.10 wt %. In a yet further aspect, the tris(2,4-di-tert-butylphenyl)phosphite is present in an amount of about 0.11 wt %. In an even further aspect, the tris(2,4-di-tert-butylphenyl)phosphite is present in an amount of about 0.12 wt %.

In further aspect, the composition comprises a flow promoter. In a still further aspect, the flow promoter is a low molecular weight hydrocarbon resin made from C5-C9 petroleum feedstock. In a yet further aspect, the flow promoter is a low molecular weight hydrocarbon resin made from C5-C9 petroleum feedstock and is fully hydrogenated.

In a further aspect, the flow promoter is present in an amount of about 0 wt % to about 7 wt %. In a still further aspect, the flow promoter is present in an amount of about 1 wt % to about 6 wt %. In a yet further aspect, the flow promoter is present in an amount of about 2 wt % to about 5 wt %. In an even further aspect, the flow promoter is present in an amount of about 2 wt %. In a still further aspect, the flow promoter is present in an amount of about 3 wt %. In yet further aspect, the flow promoter is present in an amount of about 4 wt %.

In a further aspect, the composition comprises a plasticizer or molder release agent. In a still further aspect, the plasticizer or mold release agent is selected from the group consisting of stearic acid, hydroxystearic acid, and other higher fatty acids, hydroxyfatty acids, and other fatty acid mold-release agents; stearic acid amide, ethylenebisstearamide, and other fatty acid amides, alkylenebisfatty acid amides, and other fatty acid amide mold-release agents; stearyl alcohol, cetyl alcohol, and other aliphatic alcohols, polyhydric alcohols, polyglycols, polyglycerols and other alcoholic mold release agents; butyl stearate, pentaerythritol tetrastearate, and other lower alcohol esters of fatty acid, polyhydric alcohol esters of fatty acid, and polyglycol esters of fatty acid, and other fatty acid ester mold release agents. In a yet further aspect, the plasticizer or mold release agent is pentarythritol tetrastearate.

In a further aspect, the plasticizer or mold release agent is present in an amount from about 0.05 wt % to about 0.7 wt %.

In a still further aspect, the plasticizer or mold release agent is present in an amount from about 0.05 wt % to about 0.5 wt %. In a yet further aspect, the plasticizer or mold release agent is present in an amount from about 0.1 wt % to about 0.5 wt %. In an even further aspect, the plasticizer or mold release agent is present in an amount from about 0.2 wt % to about 0.4 wt %. In a still further aspect, the plasticizer or mold release agent is present in an amount from about 0.2 wt % to about 0.5 wt %. In a yet further aspect, the plasticizer or mold release agent is present in an amount of about 0.24 wt %. In an even further aspect, the plasticizer or mold release agent is present in an amount of about 0.26 wt %. In a still further aspect, the plasticizer or mold release agent is present in an amount of about 0.28 wt %. In a yet further aspect, the plasticizer or mold release agent is present in an amount of about 0.30 wt %. In an even further aspect, the plasticizer or mold release agent is present in an amount of about 0.32 wt %.

In a further aspect, the pentarythritol tetrastearate is present in an amount from about 0.05 wt % to about 0.7 wt %. In a still further aspect, the pentarythritol tetrastearate is present in an amount from about 0.05 wt % to about 0.5 wt %. In a yet further aspect, the pentarythritol tetrastearate is present in an amount from about 0.1 wt % to about 0.5 wt %. In an even further aspect, the pentarythritol tetrastearate is present in an amount from about 0.2 wt % to about 0.4 wt %. In a still further aspect, the pentarythritol tetrastearate is present in an amount from about 0.2 wt % to about 0.5 wt %. In a yet further aspect, the pentarythritol tetrastearate is present in an amount of about 0.24 wt %. In an even further aspect, the pentarythritol tetrastearate is present in an amount of about 0.26 wt %. In a still further aspect, the pentarythritol tetrastearate is present in an amount of about 0.28 wt %. In a yet further aspect, the pentarythritol tetrastearate is present in an amount of about 0.30 wt %. In an even further aspect, the pentarythritol tetrastearate is present in an amount of about 0.32 wt %.

In various aspects, the composition has an improved Notched Izod Impact strength compared to a reference composition essentially similar to the composition except that the first polycarbonate is replaced with the second polycarbonate component.

In a further aspect, the composition has a Notched Izod Impact strength of at least about 45 kJ/m$^2$. In a still further aspect, the composition has a Notched Izod Impact strength of at least about 60 kJ/m$^2$. In a yet further aspect, the composition has a Notched Izod Impact strength of at least about 80 kJ/m$^2$. In an even further aspect, the composition has a Notched Izod Impact strength of at least about 45, 50, 55, 60, 65, 70, 75, or 80 kJ/m$^2$.

In a further aspect, the composition has a Tensile Modulus of at least about 2100 MPa. In a still further aspect, the composition has a Tensile Modulus of at least about 2150 MPa. In a yet further aspect, the composition has a Tensile Modulus of at least about 2200 MPa. In an even further aspect, the composition has a Tensile Modulus of at least about 2250 MPa. In a still further aspect, the composition has a Tensile Modulus of at least about 2300 MPa. In a yet further aspect, the composition has a Tensile Modulus of at least about 2350 MPa. In an even further aspect, the composition has a Tensile Modulus of at least about 2400 MPa.

In a further aspect, the composition has a Tensile Strength of at least about 51 MPa. In a still further aspect, the composition has a Tensile Strength of at least about 52 MPa. In a yet further aspect, the composition has a Tensile Strength of at least about 53 MPa. In an even further aspect, the composition has a Tensile Strength of at least about 54 MPa. In a still further aspect, the composition has a Tensile Strength of at least about 55 MPa In a yet further aspect, the composition has a Tensile Strength of at least about 56 MPa In an even further aspect, the composition has a Tensile Strength of at least about 57 MPa.

In a further aspect, a disclosed composition comprises: a) about 49.6 wt % of the first polycarbonate component; wherein the first polycarbonate component is isosorbide-resorcinol-bisphenol A polycarbonate terpolymer; b) about 3.1 wt % of a third polycarbonate component; wherein the third polycarbonate is a low-flow polycarbonate comprising monomer units of bisphenol A; c) about 14 wt % of an ABS copolymer; and d) about 21 wt % of a PMMA copolymer.

In a further aspect, a disclosed polycarbonate composition comprises: a) about 38 wt % of the first polycarbonate component; wherein the first polycarbonate component is isosorbide-resorcinol-bisphenol A polycarbonate terpolymer; b) about 8 wt % a of the optional second polycarbonate component; c) about 6.7 wt % of a third polycarbonate component; wherein the third polycarbonate is a low-flow polycarbonate comprising monomer units of bisphenol A; d) about 14 wt % of an ABS copolymer; and e) about 21 wt % of a PMMA copolymer.

In a further aspect, a disclosed polycarbonate composition comprises: a) about 56.7 wt % of the first polycarbonate component; wherein the first polycarbonate component is isosorbide-resorcinol-bisphenol A polycarbonate terpolymer; b) about 14 wt % of an ABS copolymer; and c) about 21 wt % of a PMMA copolymer.

In a further aspect, a disclosed polycarbonate composition comprises: a) about 56.7 wt % of the first polycarbonate component; wherein the first polycarbonate component is isosorbide-resorcinol-bisphenol A polycarbonate terpolymer; b) about 14% wt acrylonitrile-butadiene-styrene; and c) about 21% wt polylactic acid.

In a further aspect, a disclosed polycarbonate composition comprises: a) a first polycarbonate; wherein the first polycarbonate component is a polycarbonate terpolymer comprising monomer units of isosorbide, bisphenol A, and resorcinol; b) an optional second polycarbonate component; wherein the second polycarbonate component is a polycarbonate polymer comprising monomer units of bisphenol A; c) a third polycarbonate component; wherein the third polycarbonate component is a polycarbonate-polysiloxane copolymer; d) at least one impact modifier component; and e) a polyacrylate polymer component.

In a further aspect, a disclosed polycarbonate composition comprises: a) a first polycarbonate; wherein the first polycarbonate component is a polycarbonate terpolymer comprising monomer units of isosorbide, bisphenol A, and resorcinol; b) an optional second polycarbonate component; wherein the second polycarbonate component is a polycarbonate polymer comprising monomer units of bisphenol A; c) at least one impact modifier component; and d) a polyacrylate polymer component.

In a further aspect, a disclosed polycarbonate composition comprises: a) a polycarbonate component comprising an isosorbide/resorcinol/bisphenol-A polycarbonate terpolymer, wherein the isosorbide/resorcinol/bisphenol-A polycarbonate terpolymer has a respective molar weight ratio of about 50(isosorbide)/25(resorcinol)/25(bisphenol-A), wherein the isosorbide/resorcinol/bisphenol-A polycarbonate terpolymer is present in the composition in an amount from greater than 35 wt % to about 60 wt % of the composition; b) an acrylonitrile-butadiene-styrene polymer, wherein the acrylonitrile-butadiene-styrene polymer is present in the composition in an amount from greater than 0 to 20 wt %; and c) a polymethylmethacrylate, wherein the polymethylmethacrylate is present in the composition in an amount from greater than 0 to 25 wt %.

In a further aspect, a disclosed polycarbonate composition comprises: a) a polycarbonate component comprising an isosorbide/resorcinol/bisphenol-A polycarbonate terpolymer, wherein the isosorbide/resorcinol/bisphenol-A polycarbonate terpolymer has a respective molar weight ratio of about 50(isosorbide)/25(resorcinol)/25(bisphenol-A), wherein the isosorbide/resorcinol/bisphenol-A polycarbonate terpolymer is present in the composition in an amount from greater than 35 wt % to about 60 wt % of the composition; b) an acrylonitrile-butadiene-styrene polymer, wherein the acrylonitrile-butadiene-styrene polymer is present in the composition in an amount from greater than 0 to 20 wt %; and c) a polylactic acid, wherein the polylactic acid is present in the composition in an amount from greater than 0 to 25 wt %.

In a further aspect, a disclosed polycarbonate composition comprises: a) a first polycarbonate component; wherein the first polycarbonate component is a polycarbonate terpolymer comprising monomer units of isosorbide, bisphenol A, and resorcinol; wherein the isosorbide monomer units are present in about 25 mol % to about 75 mol %; wherein the resorcinol monomer units are present in about 15 mol % to about 50 mol %; wherein the bisphenol A monomer units are present in about 15 mol % to about 50 mol %; and wherein the first polycarbonate component is present in an amount from about 10 wt % to about 75 wt %; b) an optional second polycarbonate component; wherein the second polycarbonate component is a polycarbonate polymer comprising monomer units of bisphenol A; wherein the second polycarbonate component is present in an amount from about 0 wt % to about 60 wt %; c) an acrylonitrile-butadiene-styrene ("ABS") copolymer component; and wherein the ABS copolymer is present in an amount from about 5 wt % to about 30 wt %; d) a polyacrylate component; and wherein the polyacrylate is present in an amount from about 5 wt % to about 40 wt %; and e) a wt % balance of one or more additives.

In a further aspect, a disclosed polycarbonate composition comprises: a) a first polycarbonate component; wherein the first polycarbonate component is a polycarbonate terpolymer comprising monomer units of isosorbide, bisphenol A, and resorcinol; wherein the isosorbide monomer units are present in about 25 mol % to about 75 mol %; wherein the resorcinol monomer units are present in about 15 mol % to about 50 mol %; wherein the bisphenol A monomer units are present in about 15 mol % to about 50 mol %; and wherein the first polycarbonate component is present in an amount from about 10 wt % to about 75 wt %; b) an optional second polycarbonate component; wherein the second polycarbonate component is a polycarbonate polymer comprising monomer units of bisphenol A; wherein the second polycarbonate component is present in an amount from about 0 wt % to about 60 wt %; c) an acrylonitrile-butadiene-styrene ("ABS") copolymer component, wherein the ABS copolymer is present in an amount from about 5 wt % to about 30 wt %; d) a polyacrylate component, wherein the polyacrylate is present in an amount from about 5 wt % to about 40 wt %; and e) a wt % balance of one or more additives; wherein the composition exhibits Notched Izod Impact strength at least 25% greater than that of reference composition in which the first polycarbonate component is absent and consisting of essentially the same proportions of the same ABS copolymer component, the same polyacrylate component, the same wt % balance of one or more additives, and the second polycarbonate component is present in the reference composition in an amount essentially the same as the combined amount of the first and first polycarbonate components of the composition.

In still a further aspect, a disclosed polycarbonate composition comprises: a) a first polycarbonate component; wherein the first polycarbonate component is a polycarbonate terpolymer comprising monomer units of isosorbide, bisphenol A, and resorcinol; wherein the isosorbide monomer units are present in about 25 mol % to about 75 mol %; wherein the resorcinol monomer units are present in about 15 mol % to about 50 mol %; wherein the bisphenol A monomer units are present in about 15 mol % to about 50 mol %; and wherein the first polycarbonate component is present in an amount from about 10 wt % to about 75 wt %; b) an optional second polycarbonate component; wherein the second polycarbonate component is a polycarbonate polymer comprising monomer units of bisphenol A; and wherein the second polycarbonate component is present in an amount from about 0 wt % to about 60 wt %; c) an acrylonitrile-butadiene-styrene ("ABS") copolymer component; and wherein the ABS copolymer is present in an amount from about 5 wt % to about 30 wt %; d) a polylactic acid ("PLA") component; and wherein the PLA is present in an amount from about 5 wt % to about 40 wt %; and e) a wt % balance of one or more additives.

In a further aspect, a disclosed polycarbonate composition comprises: a) a first polycarbonate component; wherein the first polycarbonate component is a polycarbonate terpolymer comprising monomer units of isosorbide, bisphenol A, and resorcinol; wherein the isosorbide monomer units are present in about 25 mol % to about 75 mol %; wherein the resorcinol monomer units are present in about 15 mol % to about 50 mol %; wherein the bisphenol A monomer units are present in about 15 mol % to about 50 mol %; wherein the first polycarbonate component is present in an amount from about 10 wt % to about 75 wt %; b) an optional second polycarbonate component; wherein the second polycarbonate component is a polycarbonate polymer comprising monomer units of bisphenol A; wherein the second polycarbonate component is present in an amount from about 0 wt % to about 60 wt %; c) an acrylonitrile-butadiene-styrene ("ABS") copolymer component; and wherein the ABS copolymer is present in an amount from about 5 wt % to about 30 wt %; d) a polylactic acid ("PLA") component; and wherein the PLA is present in an amount from about 5 wt % to about 40 wt %; and e) a wt % balance of one or more additives. According to this aspect the composition exhibits Notched Izod Impact strength at least 25% greater than that of reference composition in which the first polycarbonate component is absent and consisting of essentially the same proportions of the same ABS copolymer component, the same PLA component, the same wt % balance of one or more additives, and the second polycarbonate component is present in the reference composition in an amount essentially the same as the combined amount of the first and first polycarbonate components of the composition.

In a further aspect, a disclosed polycarbonate composition comprises: a) a first polycarbonate; wherein the first polycarbonate component is a polycarbonate terpolymer comprising monomer units of isosorbide, bisphenol A, and resorcinol; b) an optional second polycarbonate component; wherein the second polycarbonate component is a polycarbonate polymer comprising monomer units of bisphenol A; and wherein the second polycarbonate component is a high-flow polycarbonate polymer; and c) an optional third polycarbonate component; wherein the third polycarbonate component is a polycarbonate polymer comprising monomer units of bisphenol A; and wherein the third polycarbonate component is a low-flow polycarbonate polymer; d) at least one impact modifier component; and e) a polyacrylate component.

In a further aspect, a disclosed polycarbonate composition comprises: a) a first polycarbonate; wherein the first polycarbonate component is a polycarbonate terpolymer comprising monomer units of isosorbide, bisphenol A, and resorcinol; b) an optional second polycarbonate component; wherein the second polycarbonate component is a polycarbonate polymer comprising monomer units of bisphenol A; and wherein the second polycarbonate component is a high-flow polycarbonate polymer; c) an optional third polycarbonate component; wherein the third polycarbonate component is a polycarbonate polymer comprising monomer units of bisphenol A; and wherein the third polycarbonate component is a low-flow polycarbonate polymer; d) at least one impact modifier component; and e) a polylactic acid component.

In one aspect the polycarbonate compositions disclosed herein improve upon the impact resistance of existing polycarbonate compounds. The impact resistance of the polycarbonate compositions disclosed herein can be improved by removing all or a portion of a ductile polycarbonate and incorporating a brittle polycarbonate such as, for example, an isosorbide-resorcinol-bisphenol A polycarbonate terpolymer. The amount of terpolymer in the compositional polymer blend can comprise any suitable amount by percentage weight of the entire composition from about 2% to about 60% by weight. Accordingly, in one aspect, disclosed herein are polycarbonate compositions comprising an acrylonitrile-butadiene-styrene polymer and an isosorbide-resorcinol-bisphenol A polycarbonate terpolymer, wherein the terpolymer comprises 2, 3, 4, 5, 6, 7, 8, 9, 10, 12, 14, 16, 18, 20, 25, 30, 35, 40, 45, 50, 55, or 60% wt of the total composition. In another aspect, the terpolymer of the present disclosure can comprise from about 10% wt to 60% wt of the composition, for example, 10, 12, 14, 16, 18, 20, 22, 24, 26, 28, 30, 32, 34 36, 38, 40, 42, 44, 46, 48, 50, 52, 54, 56, 58, 60% wt of the inventive polycarbonate composition. In yet another aspect, the terpolymer of the present disclosure can comprise from about 30% wt to 60% wt of the composition, for example, 30, 32, 34 36, 38, 40, 42, 44, 46, 48, 50, 52, 54, 56, 58, 60; or at least 30% wt, for example 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60% wt of the total inventive polycarbonate composition. For example, specifically disclosed are aspects where the terpolymer comprises about 38% wt of the composition. Also disclosed are aspects where the terpolymer comprises about 49.6% wt of the composition. Also disclosed are aspects where the terpolymer comprises about 56.7% wt of the composition.

In one aspect, the present disclosure provides polycarbonate compositions comprising a terpolymer comprising an isosorbide monomer. To that end, as described above, the isosorbide containing terpolymer can comprise an isosorbide-resorcinol-bisphenol A polycarbonate terpolymer. As exemplified above, the terpolymer can also have varying relative molar weight ratios of the respective monomer units. For example, in some aspects, the terpolymer component comprises about 50% wt isosorbide; about 25% wt resorcinol, and about 25% wt bisphenol A (i.e., (50/25/25)) or a 2:1:1 weight ratio. Such terpolymers can be manufactured as described in U.S. Pat. No. 7,138,479, the entire disclosure of which is incorporated by reference herein. In other aspects, the compositions and methods described herein can relate to other isosorbide based polycarbonate materials, and the present invention is not intended to be limited to an Iso ter PC material. In still other aspects, the compositions described herein can comprise an isosorbide based polycarbonate material, such as Iso ter PC, and one or more other polycarbonate materials that can be bio-sourced, non bio-sourced, or a combination thereof. The term "Iso ter PC" as used herein is intended to generically represent a terpolymer comprising and/or prepared from an isosorbide, bis-phenol A polycarbonate, and a resorcinol.

In one aspect, the terpolymer containing polycarbonate compositions disclosed herein possess increased impact strength relative to polycarbonate materials without the terpolymer. For example, a similarly constructed polycarbonate with a terpolymer has an increased impact when compared to a similar polycarbonate having a polycarbonate rather than the terpolymer. In one aspect, disclosed herein are polycarbonate compositions, for example polycarbonate polymeric blends, having increased impact resistance relative to a polycarbonate blended composition without the terpolymer, for example, impact score of 60 kJ/m$^2$ for the terpolymer compositions relative to a 36.4 kJ/m$^2$ polycarbonate blend without the terpolymer. Also disclosed are polycarbonate compositions comprising a terpolymer having an Impact of at least about 47.6, 61.7, 65.9, or 84.2.

In another aspect, the substitution of a polycarbonate for an isosorbide-resorcinol-bisphenol A polycarbonate terpolymer in the disclosed polycarbonate blends can cause a significant increase in tensile strength, and modulus in addition to the increase in impact resistance. Thus, in one aspect, disclosed herein are polycarbonate compositions, for example polycarbonate blends, having increased notched tensile modulus relative to polycarbonate compositions without the terpolymer, for example, a notched tensile modulus of at least about 2100 MPa. For example, disclosed herein are polycarbonate compositions comprising an isosorbide-resorcinol-bisphenol A polycarbonate terpolymer having a notched tensile modulus of at least about 2140 MPa. Also disclosed are polycarbonate compositions comprising a terpolymer having a tensile modulus of at least about 2200, 2300, 2350, or 2400 MPa.

Similarly, the disclosed polycarbonate compositions can have increased tensile strength relative to polycarbonate compositions without the terpolymer. Specifically disclosed herein are polycarbonate compositions having a tensile strength of at least about 51 MPa. For example, disclosed herein are polycarbonate compositions comprising an isosorbide-resorcinol-bisphenol A polycarbonate terpolymer having a tensile strength of at least about 51.7 MPa. Also disclosed are polycarbonate compositions comprising a terpolymer having a tensile strength of at least about 52.9, 53.2, 57, or 57.5 MPa.

In various aspects, the invention relates to methods of increasing the Notched Izod Impact strength of a blend comprising an acrylonitrile-butadiene-styrene polymer component and a high-ductility polycarbonate polymer component comprising substituting all or a portion of a high-ductility polycarbonate polymer component with a disclosed composition.

In various aspects, the invention relates to methods of increasing the Notched Izod Impact strength of a polycarbonate composition comprising an acrylonitrile-butadiene-styrene polymer component and a high-ductility polycarbonate polymer component comprising substituting all or a portion of a high-ductility polycarbonate polymer component with a brittle polycarbonate terpolymer.

In various aspects, the invention relates to methods of increasing the Notched Izod Impact strength of a conventional polycarbonate composition comprising an acrylonitrile-butadiene-styrene polymer component and a relatively high-ductility polycarbonate polymer component, the method comprising substituting at least a portion of the high-ductility polycarbonate polymer component in a composition with an isorbide/resorcinol/bisphenol-A polycarbonate terpolymer.

In various aspects, the invention relates to methods of the Notched Izod Impact strength of a conventional polycarbonate composition comprising a polyacrylate component, an acrylonitrile-butadiene-styrene polymer component and a relatively high-ductility polycarbonate polymer component, the method comprising substituting at least a portion of the high-ductility polycarbonate polymer component in a composition with an isorbide/resorcinol/bisphenol-A polycarbonate terpolymer.

In various aspects, the invention relates to methods of the Notched Izod Impact strength of a conventional polycarbonate composition comprising a polylactic acid component, an acrylonitrile-butadiene-styrene polymer component and a relatively high-ductility polycarbonate polymer component, the method comprising substituting at least a portion of the high-ductility polycarbonate polymer component in a composition with an isorbide/resorcinol/bisphenol-A polycarbonate terpolymer.

In a further aspect, the polycarbonate terpolymer of the method is an isosorbide-resorcinol-bisphenol A polycarbonate terpolymer. In a still further aspect, the acrylonitrile-butadiene-styrene polymer and polycarbonate blend further comprises PMMA. In a yet further aspect, all or part of the PMMA is substituted with a polylactic acid.

Polycarbonate Polymers

In one aspect, the present disclosure provides a polycarbonate polymer blend. In various aspects, the polymeric blended composition can have useful mechanical properties such as impact strength, tensile strength, tensile modulus, and ductility. In other aspects, the isosorbide-based polycarbonates can optionally have low background color, good UV stability, and good molecular weight (Mw) stability. It is contemplated herein that the blend can comprise a polycarbonate compound.

As used herein, the terms "polycarbonate component," "polycarbonate," and "polycarbonate polymer," which can be used interchangeably, includes homopolycarbonates and copolycarbonates have repeating structural carbonate units. In one aspect, a polycarbonate can comprise any polycarbonate material or mixture of materials as recited in U.S. Pat. No. 7,786,246, which is hereby incorporated in its entirety for the specific purpose of disclosing various polycarbonate compositions and methods.

In one aspect, a polycarbonate, as disclosed herein, can be an aliphatic-diol based polycarbonate. In another aspect, a polycarbonate can comprise a carbonate unit derived from a dihydroxy compound, such as for example a bisphenol that differs from the aliphatic diol.

In various aspects, a polycarbonate is a composition comprising repeating structural carbonate units of formula (1):

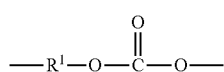
(1)

wherein the $R^1$ groups are derived from a dihydroxy compound that can be aliphatic, alicyclic, aromatic, or a combination of these groups. In a further aspect, at least about 60 percent of the total number of $R^1$ groups are aromatic organic radicals and the balance thereof are aliphatic, alicyclic, or aromatic radicals.

In a further aspect, each $R^1$ is an aromatic organic radical and, more specifically, a radical of formula (2):

(2)

wherein each of $A^1$ and $A^2$ is a monocyclic divalent aryl radical and $Y^1$ is a bridging radical having one or two atoms that separates $A^1$ from $A^2$. Alternatively, in yet further aspect, $Y^1$ is a single bond or a bridging group having one or two atoms that separates $A^1$ from $A^2$. In a still further aspect, one atom separates $A^1$ from $A^2$. For example, radicals of this type include, but are not limited to, —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ can be a hydrocarbon group or a saturated hydrocarbon group such as methylene, cyclohexylidene, or isopropylidene.

In a further aspect, polycarbonates can be produced by the interfacial reaction of dihydroxy compounds having the formula HO—$R^1$—OH, which includes dihydroxy compounds of formula (3):

(3), wherein $Y^1$, $A^1$ and $A^2$ are as described above. Also included are bisphenol compounds of general formula (4):

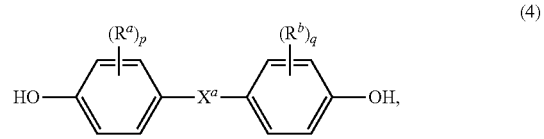
(4)

wherein $R^a$ and $R^b$ each represent a halogen atom or a monovalent hydrocarbon group and can be the same or different; p and q are each independently integers of 0 to 4; and $X^a$ represents one of the groups of formula (5):

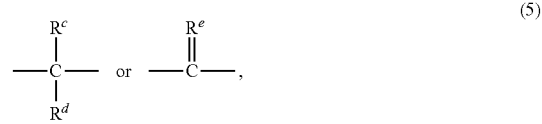
(5)

wherein $R^c$ and $R^d$ each independently represent a hydrogen atom or a monovalent linear or cyclic hydrocarbon group and $R^e$ is a divalent hydrocarbon group. Alternatively, $R^e$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, and $R^e$ is a divalent $C_{1-12}$ hydrocarbon group. In particular, $R^e$ and $R^d$ are each the same hydrogen or $C_{1-4}$ alkyl group, specifically the same $C_{1-3}$ alkyl group, even more specifically, methyl.

In various aspects, $R^e$ and $R^d$ taken together represent a $C_{3-20}$ cyclic alkylene group or a heteroatom-containing $C_{3-20}$ cyclic alkylene group comprising carbon atoms and heteroatoms with a valency of two or greater. These groups can be in the form of a single saturated or unsaturated ring, or a fused polycyclic ring system wherein the fused rings are saturated, unsaturated, or aromatic. A specific heteroatom-containing cyclic alkylene group comprises at least one heteroatom with a valency of 2 or greater, and at least two carbon atoms. Exemplary heteroatoms in the heteroatom-containing cyclic alkylene group include —O—, —S—, and —N(Z)—, where Z is a substituent group selected from hydrogen, hydroxy, $C_{1-12}$ alkyl, $C_{1-12}$ alkoxy, or $C_{1-12}$ acyl.

In a further aspect, non-limiting examples of suitable dihydroxy compounds include the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy compounds.

In various aspects, non-limiting examples of suitable bisphenol compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxy-3methylphenyl)cyclohexane 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl) sulfide, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy aromatic compounds.

In a further aspect, exemplary bisphenol compounds can comprise 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine ("PPPBP"), and 9,9-bis(4-hydroxyphenyl)fluorene. Combinations comprising at least one dihydroxy aromatic compound can also be used. In another aspect, other types of diols can be present in the isosorbide-based polycarbonate.

In a further aspect, polycarbonates with branching groups can be useful, provided that such branching does not significantly adversely affect desired properties of the polycarbonate. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethylbenzyl) phenol), 4-chloroformyl phthalic anhydride, trimesic acid, and benzophenone tetracarboxylic acid. In one aspect, a branching agent can be added at a level of about 0.05 to about 2.0 wt %. In still another aspect, mixtures comprising linear polycarbonates and branched polycarbonates can be used.

Polycarbonates, including isosorbide-based polyester-polycarbonate, can comprise copolymers comprising carbonate units and other types of polymer units, including ester units, and combinations comprising at least one of homopolycarbonates and copolycarbonates. An exemplary polycarbonate copolymer of this type is a polyester carbonate, also known as a polyester-polycarbonate. Such copolymers further contain carbonate units derived from oligomeric ester-containing dihydroxy compounds (also referred to herein as hydroxy end-capped oligomeric acrylate esters). For example, Such copolymers further contain, in addition to recurring carbonate chain units of the formula (1), repeating units of formula (6)

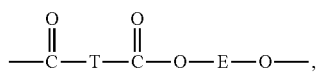

wherein E is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 carbon atoms to about 6 carbon atoms, specifically 2, 3, or 4 carbon atoms; and T is a divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In a further aspect, E is a $C_{2-6}$ alkylene radical. In another embodiment, E is derived from an aromatic dihydroxy compound of formula (7):

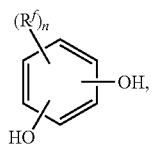

(7)

wherein each $R^f$ is independently a halogen atom, a $C_{1-10}$ hydrocarbon group, or a $C_{1-10}$ halogen substituted hydrocarbon group, and n is 0 to 4. The halogen is preferably bromine. Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Non-limiting examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is about 10:1 to about 0.2:9.8. In another specific embodiment, E is a $C_{2-6}$ alkylene radical and T is p-phenylene, m-phenylene, naphthalene, a divalent cycloaliphatic radical, or a mixture thereof. This class of polyester includes the poly(alkylene terephthalates).

In various aspects, it is understood and herein contemplated that to improve the impact resistance of an existing polymeric blend occurs by removing polycarbonate and substituting a terpolymer. Thus, for every percentage weight increase of the terpolymer, there should be a corresponding decrease in one or more components of the blend, including, for example, a polycarbonate. In one aspect, specifically disclosed are polycarbonate compositions comprising an acrylonitrile-butadiene-styrene polymer and an isosorbide-resorcinol-bisphenol A polycarbonate terpolymer, wherein a polycarbonate comprises from about 3% to 55% wt of the composition. Accordingly, in one aspect, disclosed herein are polycarbonate compositions comprising an acrylonitrile-butadiene-styrene polymer and an isosorbide-resorcinol-bisphenol A polycarbonate terpolymer, wherein a polycarbonate comprises 2, 3, 4, 5, 6, 7, 8, 9, 10, 12, 14, 16, 18, 20, 25, 30, 35, 40, 45, 50, or 55% wt of the total composition. In another aspect, the terpolymer of the present disclosure can comprise from about 3% wt to 20% wt of the composition, for example, 3, 4, 5, 6, 7, 8, 9, 10, 11, 12, 13, 14, 15, 16, 17, 18, 19, or 20% wt of the composition. For example, specifically disclosed are aspects where the terpolymer comprises about 3.1% wt of the composition. Also disclosed are aspects where the terpolymer comprises about 8% wt of the composition. Also disclosed are aspects where the terpolymer comprises about 14.7% wt of the composition.

In one aspect, polycarbonates can be manufactured using an interfacial phase transfer process or melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium such as for example methylene chloride, and contacting the reactants with a carbonate precursor (such as phosgene) in the presence of a catalyst such as, for example, triethylamine or a phase transfer catalyst salt, under controlled pH conditions of, for example, from about 8 to about 10.

The polycarbonates disclosed herein can, in various aspects, be prepared by a melt polymerization process. Generally, in the melt polymerization process, polycarbonates are prepared by co-reacting, in a molten state, the dihydroxy reactant(s) (i.e., isosorbide, aliphatic diol and/or aliphatic diacid, and any additional dihydroxy compound) and a diaryl carbonate ester, such as diphenyl carbonate, or more specifically in an aspect, an activated carbonate such as bis(methyl salicyl)carbonate, in the presence of a transesterification catalyst. The reaction can be carried out in typical polymerization equipment, such as one or more continuously stirred reactors (CSTRs), plug flow reactors, wire wetting fall polymerizers, free fall polymerizers, wiped film polymerizers, BANBURY® mixers, single or twin screw extruders, or combinations of the foregoing. In one aspect, volatile monohydric phenol can be removed from the molten reactants by distillation and the polymer is isolated as a molten residue. In another aspect, a useful melt process for making polycarbonates utilizes a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl)carboxylate, bis(4-acetylphenyl)carboxylate, or a combination comprising at least one of the foregoing.

The melt polymerization can include a transesterification catalyst comprising a first catalyst, also referred to herein as an alpha catalyst, comprising a metal cation and an anion. In an aspect, the cation is an alkali or alkaline earth metal comprising Li, Na, K, Cs, Rb, Mg, Ca, Ba, Sr, or a combination comprising at least one of the foregoing. The anion is hydroxide (OH$^-$), superoxide (O$^{2-}$), thiolate (HS$^-$), sulfide (S$^{2-}$), a $C_{1-20}$ alkoxide, a $C_{6-20}$ aryloxide, a $C_{1-20}$ carboxylate, a phosphate including biphosphate, a $C_{1-20}$ phosphonate, a sulfate including bisulfate, sulfites including bisulfites and metabisulfites, a $C_{1-20}$ sulfonate, a carbonate including bicarbonate, or a combination comprising at least one of the foregoing. In another aspect, salts of an organic acid comprising both alkaline earth metal ions and alkali metal ions can also be used. Salts of organic acids useful as catalysts are illustrated by alkali metal and alkaline earth metal salts of formic acid, acetic acid, stearic acid and ethylenediamine tetraacetic acid. The catalyst can also comprise the salt of a non-volatile inorganic acid. By "nonvolatile", it is meant that the referenced compounds have no appreciable vapor pressure at ambient temperature and pressure. In particular, these compounds are not volatile at temperatures at which melt polymerizations of polycarbonate are typically conducted. The salts of nonvolatile acids are alkali metal salts of phosphites; alkaline earth metal salts of phosphites; alkali metal salts of phosphates; and alkaline earth metal salts of phosphates. Exemplary transesterification catalysts include, lithium hydroxide, sodium hydroxide, potassium hydroxide, cesium hydroxide, magnesium hydroxide, calcium hydroxide, barium hydroxide, lithium formate, sodium formate, potassium formate, cesium formate, lithium acetate, sodium acetate, potassium acetate, lithium carbonate, sodium carbonate, potassium carbonate, lithium methoxide, sodium methoxide, potassium methoxide, lithium ethoxide, sodium ethoxide, potassium ethoxide, lithium phenoxide, sodium phenoxide, potassium phenoxide, sodium sulfate, potassium sulfate, $NaH_2PO_3$, $NaH_2PO_4$, $Na_2H_2PO_3$, $KH_2PO_4$, $CsH_2PO_4$, $Cs_2H_2PO_4$, $Na_2SO_3$, $Na_2S_2O_5$, sodium mesylate, potassium mesylate, sodium tosylate, potassium tosylate, magnesium disodium ethylenediamine tetraacetate (EDTA magnesium disodium salt), or a combination comprising at least one of the foregoing. It will be understood that the foregoing list is exemplary and should not be considered as limited thereto. In one aspect, the transesterification catalyst is an alpha catalyst comprising an alkali or alkaline earth salt. In an exemplary aspect, the transesterification catalyst comprising sodium hydroxide, potassium hydroxide, sodium carbonate, potassium carbonate, sodium methoxide, potassium methoxide, $NaH_2PO_4$, or a combination comprising at least one of the foregoing.

The amount of alpha catalyst can vary widely according to the conditions of the melt polymerization, and can be about 0.001 to about 500 μmol. In an aspect, the amount of alpha catalyst can be about 0.01 to about 20 μmol, specifically about 0.1 to about 10 μmol, more specifically about 0.5 to about 9 μmol, and still more specifically about 1 to about 7 μmol, per mole of aliphatic diol and any other dihydroxy compound present in the melt polymerization.

In another aspect, a second transesterification catalyst, also referred to herein as a beta catalyst, can optionally be included in the melt polymerization process, provided that the inclusion of such a second transesterification catalyst does not significantly adversely affect the desirable properties of the isosorbide-based polycarbonate. Exemplary transesterification catalysts can further include a combination of a phase transfer catalyst of formula $(R^3)_4Q^+X$ above, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalyst salts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a $C_{1-8}$ alkoxy group or a $C_{6-18}$ aryloxy group. Examples of such transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing. Other melt transesterification catalysts include alkaline earth metal salts or alkali metal salts. In various aspects, where a beta catalyst is desired, the beta catalyst can be present in a molar ratio, relative to the alpha catalyst, of less than or equal to 10, specifically less than or equal to 5, more specifically less than or equal to 1, and still more specifically less than or equal to 0.5. In other aspects, the melt polymerization reaction disclosed herein uses only an alpha catalyst as described hereinabove, and is substantially free of any beta catalyst. As defined herein, "substantially free of" can mean where the beta catalyst has been excluded from the melt polymerization reaction. In one aspect, the beta catalyst is present in an amount of less than about 10 ppm, specifically less than 1 ppm, more specifically less than about 0.1 ppm, more specifically less than or equal to about 0.01 ppm, and more specifically less than or equal to about 0.001 ppm, based on the total weight of all components used in the melt polymerization reaction.

In one aspect, a melt process employing an activated carbonate is utilized. As used herein, the term "activated carbonate", is defined as a diarylcarbonate that is more reactive than diphenylcarbonate in transesterification reactions. Specific non-limiting examples of activated carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl)carbonate, bis(o-formylphenyl)carbonate.

Examples of specific ester-substituted diarylcarbonates include, but are not limited to, bis(methylsalicyl)carbonate (CAS Registry No. 82091-12-1) (also known as BMSC or bis(o-methoxycarbonylphenyl)carbonate), bis(ethylsalicyl)carbonate, bis(propylsalicyl)carbonate, bis(butylsalicyl)carbonate, bis(benzylsalicyl)carbonate, bis(methyl-4-chlorosalicyl)carbonate and the like. In one aspect, bis(methylsalicyl)carbonate is used as the activated carbonate in melt polycarbonate synthesis due to its lower molecular weight and higher vapor pressure.

Some non-limiting examples of non-activating groups which, when present in an ortho position, would not be expected to result in activated carbonates are alkyl, cycloalkyl or cyano groups. Some specific and non-limiting examples of non-activated carbonates are bis(o-methylphenyl)carbonate, bis(p-cumylphenyl)carbonate, bis(p-(1,1,3,3-tetramethyl)butylphenyl)carbonate and bis(o-cyanophenyl)carbonate. Unsymmetrical combinations of these structures can also be used as non-activated carbonates.

In one aspect, an end-capping agent (also referred to as a chain-stopper) can optionally be used to limit molecular weight growth rate, and so control molecular weight in the polycarbonate. Exemplary chain-stoppers include certain monophenolic compounds (i.e., phenyl compounds having a single free hydroxy group), monocarboxylic acid chlorides, and/or monochloroformates. Phenolic chain-stoppers are exemplified by phenol and $C_1$-$C_{22}$ alkyl-substituted phenols such as p-cumyl-phenol, resorcinol monobenzoate, and p- and tertiary-butyl phenol, cresol, and monoethers of diphenols, such as p-methoxyphenol. Alkyl-substituted phenols with branched chain alkyl substituents having 8 to 9 carbon atoms can be specifically mentioned. Certain monophenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

In another aspect, endgroups can be derived from the carbonyl source (i.e., the diaryl carbonate), from selection of monomer ratios, incomplete polymerization, chain scission, and the like, as well as any added end-capping groups, and can include derivatizable functional groups such as hydroxy groups, carboxylic acid groups, or the like. In one aspect, the endgroup of a polycarbonate, including an isosorbide-based polycarbonate polymer as defined herein, can comprise a structural unit derived from a diaryl carbonate, where the structural unit can be an endgroup. In a further aspect, the endgroup is derived from an activated carbonate. Such endgroups can be derived from the transesterification reaction of the alkyl ester of an appropriately substituted activated carbonate, with a hydroxy group at the end of a polycarbonate polymer chain, under conditions in which the hydroxy group reacts with the ester carbonyl from the activated carbonate, instead of with the carbonate carbonyl of the activated carbonate. In this way, structural units derived from ester containing compounds or substructures derived from the activated carbonate and present in the melt polymerization reaction can form ester endgroups. In an aspect, the ester endgroup derived from a salicylic ester can be a residue of BMSC or other substituted or unsubstituted bis(alkyl salicyl) carbonate such as bis(ethyl salicyl)carbonate, bis(propyl salicyl)carbonate, bis(phenyl salicyl)carbonate, bis(benzyl salicyl)carbonate, or the like.

In one aspect, where a combination of alpha and beta catalysts are used in the melt polymerization, an isosorbide-based polycarbonate polymer prepared from an activated carbonate can comprise endgroups in an amount of less than 2,000 ppm, less than 1,500 ppm, or less than 1,000 ppm, based on the weight of the polycarbonate. In another aspect, where only an alpha catalyst is used in the melt polymerization, an isosorbide-based polycarbonate polymer prepared from an activated carbonate can comprise endgroups in an amount of less than or equal to 500 ppm, less than or equal to 400 ppm, less than or equal to 300 ppm, or less than or equal to 200 ppm, based on the weight of the polycarbonate.

In one aspect, the reactants for the polymerization reaction using an activated aromatic carbonate can be charged into a reactor either in the solid form or in the molten form. Initial charging of reactants into a reactor and subsequent mixing of these materials under reactive conditions for polymerization can be conducted in an inert gas atmosphere such as a nitrogen atmosphere. The charging of one or more reactants can also be done at a later stage of the polymerization reaction. Mixing of the reaction mixture is accomplished by any methods known in the art, such as by stirring. Reactive conditions include time, temperature, pressure and other factors that affect polymerization of the reactants. Typically the activated aromatic carbonate is added at a mole ratio of 0.8 to 1.3, and more preferably 0.9 to 1.3, and all subranges there between, relative to the total moles of monomer unit compounds. In a specific aspect, the molar ratio of activated aromatic carbonate to monomer unit compounds is 1.013 to 1.29, specifically 1.015 to 1.028. In another specific aspect, the activated aromatic carbonate is BMSC.

In one aspect, the melt polymerization reaction can be conducted by subjecting the reaction mixture to a series of temperature-pressure-time protocols. In some aspects, this involves gradually raising the reaction temperature in stages while gradually lowering the pressure in stages. In one aspect, the pressure is reduced from about atmospheric pressure at the start of the reaction to about 1 millibar (100 Pa) or lower, or in another aspect to 0.1 millibar (10 Pa) or lower in several steps as the reaction approaches completion. The temperature can be varied in a stepwise fashion beginning at a temperature of about the melting temperature of the reaction mixture and subsequently increased to final temperature. In one aspect, the reaction mixture is heated from room temperature to about 150° C. In such an aspect, the polymerization reaction starts at a temperature of about 150° C. to about 220° C. In another aspect, the polymerization temperature can be up to about 220° C. In other aspects, the polymerization reaction can then be increased to about 250° C. and then optionally further increased to a temperature of about 320° C., and all subranges there between. In one aspect, the total reaction time can be from about 30 minutes to about 200 minutes and all subranges there between. This procedure will generally ensure that the reactants react to give polycarbonates with the desired molecular weight, glass transition temperature and physical properties. The reaction proceeds to build the polycarbonate chain with production of ester-substituted alcohol by-product such as methyl salicylate. In one aspect, efficient removal of the by-product can be achieved by different techniques such as reducing the pressure. Generally the pressure starts relatively high in the beginning of the reaction and is lowered progressively throughout the reaction and temperature is raised throughout the reaction.

In one aspect, the progress of the reaction can be monitored by measuring the melt viscosity or the weight average molecular weight of the reaction mixture using techniques known in the art such as gel permeation chromatography. These properties can be measured by taking discrete samples or can be measured on-line. After the desired melt viscosity and/or molecular weight is reached, the final polycarbonate product can be isolated from the reactor in a solid or molten form. It will be appreciated by a person skilled in the art, that the method of making aliphatic homopolycarbonate and aliphatic-aromatic copolycarbonates as described in the preceding sections can be made in a batch or a continuous process and the process disclosed herein is preferably carried out in a solvent free mode. Reactors chosen should ideally be self-cleaning and should minimize any "hot spots." However, vented extruders similar to those that are commercially available can be used.

In one aspect, the aliphatic homopolycarbonate and aliphatic-aromatic copolycarbonate can be prepared in an extruder in presence of one or more catalysts, wherein the carbonating agent is an activated aromatic carbonate. In one aspect, the reactants for the polymerization reaction can be fed to the extruder in powder or molten form. In another aspect, the reactants are dry blended prior to addition to the extruder. The extruder can be equipped with pressure reducing devices (e.g., vents), which serve to remove the activated phenol by-product and thus drive the polymerization reaction toward completion. The molecular weight of the polycarbonate product can, in various aspects, be manipulated by controlling, among other factors, the feed rate of the reactants, the type of extruder, the extruder screw design and configuration, the residence time in the extruder, the reaction temperature and the pressure reducing techniques present on the extruder. The molecular weight of the polycarbonate product can also depend upon the structures of the reactants, such as, activated aromatic carbonate, aliphatic diol, dihydroxy aromatic compound, and the catalyst employed. Many different screw designs and extruder configurations are commercially available that use single screws, double screws, vents, back flight and forward flight zones, seals, and sidestreams. One skilled in the art can find the best designs using generally known principals of commercial extruder design. Controlling the ratio of diarylcarbonate/diol, specifically BMSC/diol can impact the Mw when using an activated carbonate. A lower ratio can generally provide a higher molecular weight.

In one aspect, decomposition by-products of the reaction that are of low molecular weight can be removed by, for example, devolatilization during reaction and/or extrusion to reduce the amount of such volatile compounds. The volatiles typically removed can include unreacted starting diol materials, carbonate precursor materials, but are more specifically the decomposition products of the melt-polymerization reaction.

In addition to the isosorbide-based polycarbonates described above, thermoplastic compositions comprising combinations of the isosorbide-based polycarbonate with other thermoplastic polymers that do not comprise isosorbide-based carbonate units can be prepared using, for example other polycarbonates including homopolycarbonates and other polycarbonate copolymers (i.e., copolycarbonates). These combinations can comprise 1 to 99 wt %, specifically 10 to 90, more specifically 20 to 80 wt % of the isosorbide-based polycarbonate, with the remainder of the compositions being other of the foregoing additional polymers, and/or additives as described below. In an aspect, the thermoplastic composition comprises the isosorbide-based polycarbonate, an additional polymer, and/or an additive.

Polycarbonate-Polysiloxane Copolymers

The composition further comprises a polycarbonate-polysiloxane copolymer comprising polycarbonate blocks and polydiorganosiloxane blocks. The polycarbonate blocks in the copolymer comprise repeating structural units of formula (1) as described above, for example wherein $R^1$ is of formula (2) as described above. These units may be derived from reaction of dihydroxy compounds of formula (3) as described above. In a further aspect, the dihydroxy compound is bisphenol A, in which each of $A^1$ and $A^2$ is p-phenylene and $Y^1$ is isopropylidene.

The polydiorganosiloxane blocks comprise repeating structural units of formula (8) (sometimes referred to herein as siloxane):

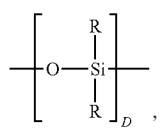

wherein each occurrence of R is same or different, and is a $C_{1-13}$ monovalent organic radical. For example, R may be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. Combinations of the foregoing R groups may be used in the same copolymer.

The value of D in formula (8) may vary widely depending on the type and relative amount of each component in the thermoplastic composition, the desired properties of the composition, and like considerations. Generally, D may have an average value of 2 to about 1000, specifically about 2 to about 500, more specifically about 5 to about 100. In one embodiment, D has an average value of about 10 to about 75, and in still another embodiment, D has an average value of about 40 to about 60. Where D is of a lower value, e.g., less than about 40, it may be desirable to use a relatively larger amount of the polycarbonate-polysiloxane copolymer. Conversely, where D is of a higher value, e.g., greater than about 40, it may be necessary to use a relatively lower amount of the polycarbonate-polysiloxane copolymer.

A combination of a first and a second (or more) polycarbonate-polysiloxane copolymers may be used, wherein the average value of D of the first copolymer is less than the average value of D of the second copolymer.

In one embodiment, the polydiorganosiloxane blocks are provided by repeating structural units of formula (9):

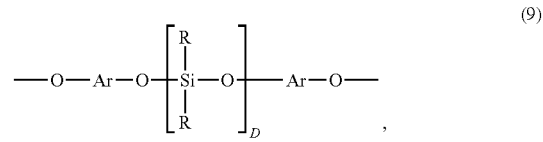

wherein D is as defined above; each R may be the same or different, and is as defined above; and Ar may be the same or different, and is a substituted or unsubstituted $C_6$-$C_{30}$ arylene radical, wherein the bonds are directly connected to an aromatic moiety. Suitable Ar groups in formula (9) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of suitable dihydroxyarylene compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulphide), and 1,1-bis(4-hydroxy-t-butylphenyl)propane. Combinations comprising at least one of the foregoing dihydroxy compounds may also be used.

Such units may be derived from the corresponding dihydroxy compound of the following formula:

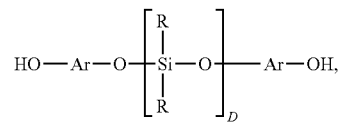

wherein Ar and D are as described above. Such compounds are further described in U.S. Pat. No. 4,746,701 to Kress et al. Compounds of this formula may be obtained by the reaction of a dihydroxyarylene compound with, for example, an alpha, omega-bisacetoxypolydiorangonosiloxane under phase transfer conditions.

In another embodiment the polydiorganosiloxane blocks comprise repeating structural units of formula (10)

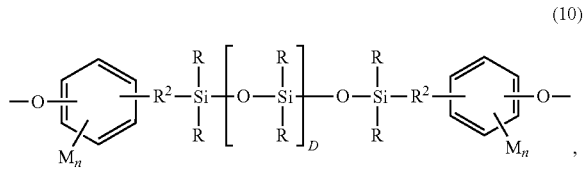

wherein R and D are as defined above. $R^2$ in formula (10) is a divalent $C_2$-$C_8$ aliphatic group. Each M in formula (9) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$-$C_3$ aliphatic group, and R is methyl.

These units may be derived from the corresponding dihydroxy polydiorganosiloxane (11):

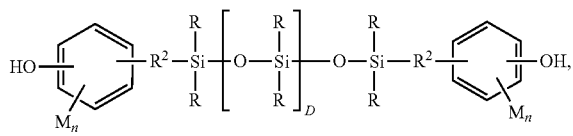
(11)

wherein R, D, M, $R^2$, and n are as described above.

Such dihydroxy polysiloxanes can be made by effecting a platinum catalyzed addition between a siloxane hydride of the formula (12):

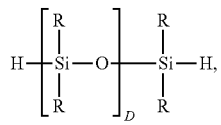
(12)

wherein R and D are as previously defined, and an aliphatically unsaturated monohydric phenol. Suitable aliphatically unsaturated monohydric phenols included, for example, eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

The polycarbonate-polysiloxane copolymer may be manufactured by reaction of diphenolic polysiloxane (11) with a carbonate source and a dihydroxy aromatic compound of formula (3), optionally in the presence of a phase transfer catalyst as described above. Suitable conditions are similar to those useful in forming polycarbonates. For example, the copolymers are prepared by phosgenation, at temperatures from below 0° C. to about 100° C., preferably about 25° C. to about 50° C. Since the reaction is exothermic, the rate of phosgene addition may be used to control the reaction temperature. The amount of phosgene required will generally depend upon the amount of the dihydric reactants. Alternatively, the polycarbonate-polysiloxane copolymers may be prepared by co-reacting in a molten state, the dihydroxy monomers and a diaryl carbonate ester, such as diphenyl carbonate, in the presence of a transesterification catalyst as described above.

In the production of the polycarbonate-polysiloxane copolymer, the amount of dihydroxy polydiorganosiloxane is selected so as to provide the desired amount of polydiorganosiloxane units in the copolymer. The amount of polydiorganosiloxane units may vary widely, i.e., may be about 1 wt. % to about 99 wt. % of polydimethylsiloxane, or an equivalent molar amount of another polydiorganosiloxane, with the balance being carbonate units. The particular amounts used will therefore be determined depending on desired physical properties of the thermoplastic composition, the value of D (within the range of 2 to about 1000), and the type and relative amount of each component in the thermoplastic composition, including the type and amount of polycarbonate, type and amount of impact modifier, type and amount of polycarbonate-polysiloxane copolymer, and type and amount of any other additives. Suitable amounts of dihydroxy polydiorganosiloxane can be determined by one of ordinary skill in the art without undue experimentation using the guidelines taught herein. For example, the amount of dihydroxy polydiorganosiloxane may be selected so as to produce a copolymer comprising about 1 wt. % to about 75 wt. %, or about 1 wt. % to about 50 wt. % polydimethylsiloxane, or an equivalent molar amount of another polydiorganosiloxane. In one embodiment, the copolymer comprises about 5 wt. % to about 40 wt. %, optionally about 5 wt. % to about 25 wt. % polydimethylsiloxane, or an equivalent molar amount of another polydiorganosiloxane, with the balance being polycarbonate. In a particular embodiment, the copolymer may comprise about 20 wt. % siloxane.

The polycarbonate-polysiloxane copolymers have a weight-average molecular weight (MW, measured, for example, by gel permeation chromatography, ultra-centrifugation, or light scattering) of about 10,000 g/mol to about 200,000 g/mol, specifically about 20,000 g/mol to about 100,000 g/mol.

It is the siloxane component of the polycarbonate-polysiloxane copolymer that is believed to yield the superior ductility characteristics demonstrated in the Examples below. Accordingly, the quantity of polycarbonate-polysiloxane copolymer in the composition may be selected to provide a desired siloxane content in the composition. For example, to achieve at least 1 wt. % siloxane in the composition using a polycarbonate-polysiloxane copolymer containing 20 wt. % siloxane, the composition may comprise at least 5 wt. % by weight of the polycarbonate-polysiloxane copolymer, or at least 10 wt. % of a polycarbonate-polysiloxane copolymer containing only 10 wt. % siloxane in the copolymer, etc. In various embodiments, the composition may comprise at least about 1 wt. % siloxane, optionally at least 1.3 wt. % siloxane, to provide low temperature (e.g., −30° C. or −40° C.) ductility. In other embodiments, the composition may comprise at least about 2 wt. % siloxane, optionally at least 2.5 wt. % siloxane or, optionally, about 5 wt. % siloxane or more, for ductility at low temperatures. In still other embodiments, the composition may comprise 1 to 15 wt. % or 2 to 9 wt. % or, optionally, 1 to 5 wt. % polydimethyl siloxane units or the equivalent molar amount of other polydiorgano siloxane units ("siloxane") calculated with respect to the weight of the total composition.

The amount of polycarbonate in the composition will vary according to the quantity of the other components, especially the polycarbonate-polysiloxane copolymer, so that when more polycarbonate-polysiloxane copolymer is used, less polycarbonate may be used. For example, to provide a selected siloxane content in a composition, less of a high siloxane-content polycarbonate-polysiloxane copolymer is needed than of a low-siloxane content copolymer, so polycarbonate may constitute a larger proportion in the former case than in the latter, other components optionally being unchanged. For example, a composition may comprise 75 wt. % polycarbonate resin and 10 wt. % of a polycarbonate-polysiloxane copolymer comprising about 20 wt. % siloxane and 80 wt. % polycarbonate groups in the copolymer, providing 2 wt. % siloxane in the composition and 8 wt. % polycarbonate groups in addition to the 75 wt. % polycarbonate for a total of 83 wt. % polycarbonate component in the composition. Another composition containing 83 wt. % polycarbonate component and 2 wt. % siloxane may comprise 65 wt. % polycarbonate resin and 20 wt. % of a polycarbonate-polysiloxane copolymer comprising 10 wt. % siloxane and 90 wt. % polycarbonate groups in the copolymer.

Impact Modifier

The polycarbonate of the present invention comprises one or more impact modifying agents, or impact modifiers. In one aspect, suitable impact modifiers are can be high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. In another aspect, a combination of any two or more individual impact modifiers can be used.

An exemplary type of impact modifier is an elastomer-modified graft copolymer comprising an elastomeric (i.e., rubbery) polymer substrate having a $T_g$ less than about 10° C., less than about −10° C., or about −40° C. to −80° C., and a rigid polymeric superstrate grafted to the elastomeric polymer substrate. Materials suitable for use as the elastomeric phase include, for example, conjugated diene rubbers, for example polybutadiene and polyisoprene; copolymers of a conjugated diene with less than about 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_{1-6}$ esters of acrylic acid and methacrylic acid, specifically poly methyl methacrylate (PMMA).

Exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN).

In one aspect, the inventive polycarbonate composition comprises a styrene-ethylene-butadiene-styrene (SEBS) elastomer. In one aspect, a SEBS impact modifier comprises about 13 wt. % styrene, such as, for example, KRATON® G 1657M, available from Kraton Polymers. In another aspect, a SEBS impact modifier comprises about 33 wt. % styrene, such as, for example, KRATON® G 1651H, available from Kraton Polymers. In yet another aspect, a SEBS impact modifier comprises about 67 wt. % styrene, such as, for example, TUFTEC® H1043, available from Asahi Kasei Chemicals Corporation. In other aspects, other SEBS impact modifiers comprising various amounts of styrene can be used. Such impact modifiers are commercially available, and one of skill in the art, in possession of this disclosure, could readily select an appropriate SEBS impact modifier.

In one aspect, an inventive polycarbonate composition can comprise from about 1 wt. % to 30 wt %, for example, about 1, 2, 4, 6, 8, 10, 12, 14, 16, 18, 20, 22, 24, 26, 28, or 30 wt. %, of an impact modifier, based on the total weight of the isosorbide-based polycarbonate, and any additional polymer including impact modifier, in the composition. In another aspect, an inventive polycarbonate composition can comprise from about 1 wt. % to about 25 wt. %, for example, about 1, 3, 5, 7, 9, 11, 13, 15, 17, 19, 21, 23, or 25 wt. %, for example, about 21 wt. % of an impact modifier. In a specific aspect, an inventive polycarbonate composition comprises from about 21% wt. of PMMA. In other aspects, the a specific amount of any one or more impact modifiers can vary, based on the remaining components in the system and desired properties of the resulting polymer. One of skill in the art, in possession of this disclosure, could readily select an appropriate amount of any one or more impact modifiers to use in a polymer composition.

In one aspect, a polycarbonate without an additional impact modifier can have a low Notched Izod Impact (NII) rating, for example, less than about 5 (i.e., it is brittle, for example isosorbide-resorcinol-bisphenol A has an impact of 5.27 and poly lactic acid even lower still). Alternatively, a polycarbonate can have an impact score revealing ductility (e.g., PC172X has an impact score of 56.69 kJ·m$^2$). In one aspect, when an impact modifier is blended with a polycarbonate blend, the NII strength can be improved as compared to conventional a polycarbonate blend not containing an impact modifier. In one aspect, the disclosed polycarbonate compositions disclosed herein further comprise an impact modifier, such as, for example, poly(methylmethacrylate) (PMMA). In one aspect disclosed herein are polycarbonate compositions comprising a) about 14% wt acrylonitrile-butadiene-styrene; b) about 8% wt PC172; c) about 6.7% wt PC105; d) about 21% wt poly methyl methacrylate; and e) about 38% wt isosorbide-resorcinol-bisphenol A polycarbonate terpolymer. Also disclosed are polycarbonate compositions comprising a) about 14% wt acrylonitrile-butadiene-styrene; b) about 3.1% wt PC105; c) about 21% wt poly methyl methacrylate; and d) about 49.6% wt isosorbide-resorcinol-bisphenol A polycarbonate terpolymer. Also disclosed are polycarbonate compositions comprising a) about 14% wt acrylonitrile-butadiene-styrene; b) about 21% wt poly methyl methacrylate; and c) about 56.7% wt isosorbide-resorcinol-bisphenol A polycarbonate terpolymer.

In another aspect, the NII strength of a polymeric blended composition can be improved by adding an impact modifier that is more brittle rather than more ductile than the composition without the impact modifier. For example In one aspect, the disclosed polycarbonate compositions disclosed herein further comprise an impact modifier, such as, for example, poly lactic acid (PLA). It is contemplated herein that if an impact modifier with high impact (i.e., highly ductile) substituted with a brittle impact modifier, impact can increase. Accordingly, one method of improving impact strength is by substituting in whole or in part a ductile impact modifier (e.g., PMMA) with a more brittle impact modifier (e.g., PLA). Accordingly, in one aspect disclosed are polycarbonate compositions comprising a) about 14% wt acrylonitrile-butadiene-styrene; b) b) about 21% wt poly lactic acid; and c) about 56.7% wt isosorbide-resorcinol-bisphenol A polycarbonate terpolymer.

As replacing an impact modifier in the disclosed compositions with a more brittle impact modifier increases impact, disclosed herein are methods of increasing the impact of a polycarbonate composition comprising an acrylonitrile-butadiene-styrene polymer and polycarbonate blend comprising substituting all or a portion of a polycarbonate with high ductility with a brittle terpolymer, and wherein the starting polycarbonate composition further comprises PMMA, the method further comprises substituting all or part of the PMMA with poly lactic acid.

Optional Composition Additives

In addition to the first polycarbonate component, the second polycarbonate component, and the impact modifier, the polycarbonate compositions disclosed herein can further comprise one or more other materials or additives ordinarily incorporated in resin compositions of this type that can maintain and/or improve various properties of the resulting material, with the proviso that the additives are selected so as to not significantly adversely affect the desired properties of the polycarbonate composition. Combinations of additives can be used. For example, a disclosed polycarbonate composition can further comprise one or more of an antioxidant, flame retardant, heat stabilizer, light stabilizer, UV absorbing additive, plasticizer, lubricant, mold release agent, antistatic agent, colorant (e.g., pigment and/or dye), or a combination thereof. Such additives can be mixed at a suitable time during the mixing of the components for forming the composition.

The additive may include, but are not limited to, fillers, antioxidants, lubricants, flame retardants, nucleating agents, coupling agents, ultraviolet absorbers, ultraviolet stabilizers, pigments, dyes, plasticizers, processing aids, viscosity control agents, tackifiers, anti-blocking agents, surfactants, extender oils, metal deactivators, voltage stabilizers, boosters, catalysts, smoke suppressants and the like, or a combination containing at least one of the foregoing, depending on the final selected characteristics of the compositions. Examples of additives, fillers and the like that may be used in the present invention include, but are not limited to, antioxidants, mineral fillers, and the like, or a combination containing at least one of the foregoing. For example, the disclosed compositions of the invention can also be combined with various additives including, but not limited to, colorants such as titanium dioxide, zinc sulfide and carbon black; stabilizers or antioxidants such as hindered phenols, phosphites, phosphonites, thioesters and mixtures thereof, as well as mold release agents, lubricants, flame retardants, smoke suppressors and anti-drip agents, for example, those based on fluoropolymers.

In various aspects, the composition additive comprises one or more of a colorant, anti-oxidant, mold release agent, lubricant, flame retardant agent, smoke suppressor agent, and anti-drip agent.

In a further aspect, the composition can further comprise an antioxidant in an amount from about 0.001 pph to about 0.500 pph. In a yet further aspect, the antioxidant is selected from hindered phenols, phosphites, phosphonites, thioesters and any mixture thereof.

In a further aspect, the compositions of the present invention further comprise a colorant in an amount from about 0.001 pph to about 5.000 pph. In a still further aspect, the colorant is selected from the group consisting of carbon black and titanium dioxide. In a yet further aspect, the colorant is carbon black. In an even further aspect, the colorant is titanium dioxide. In a still further aspect, the titanium dioxide is encapsulated with a silica alumino layer which is passivated with a silicon containing compound. The titanium dioxide can be passivated by treatment with silica and/or alumina by any of several methods which are well known in the art including, without limit, silica and/or alumina wet treatments used for treating pigment-sized titanium dioxide.

The compositions of the invention can also be combined with various additives including, but not limited to, colorants such as titanium dioxide, zinc sulfide and carbon black; stabilizers such as hindered phenols, phosphites, phosphonites, thioesters and mixtures thereof, as well as mold release agents, lubricants, flame retardants, smoke suppressors and anti-drip agents, for example, those based on fluoro polymers. Use of phosphonate or phosphite compounds or mixtures thereof may be desired in some instances to improve color and oxidative stability. In another instance triaryl phosphonate, phosphite compounds or mixtures thereof may be employed. Effective amounts of the additives vary widely, but they are usually present in an amount up to about 0.01-20% or more by weight, based on the weight of the entire composition. Flame retardants based on sulfonate salts, such a perfluoro alky metal sulfonates, aryl sulfonate salts or mixtures thereof, aryl phosphates and halogenated aromatic compounds may be useful. Ultraviolet light stabilizers can also be added to the compositions in effective amounts. Preferred mold release agents are alkyl carboxylic acid esters, for example, pentaerythritol tetrastearate, glycerin tristearate and ethylene glycol distearate. Mold release agents are typically present in the composition at 0.01-0.5% by weight of the formulation. Other examples of mold release agents are may also be alpha-olefins or low molecular weight poly alpha olefins, or blends thereof.

Examples of antioxidants include, but are not limited to, hindered phenols such as tetrakis[methylene(3,5-di-t-butyl-4-hydroxyhydrocinnamate)]-methane, 4,4'-thiobis(2-methyl-6-tert-butylphenol), and thiodiethylene bis(3,5-di-tert-butyl-4-hydroxy)hydrocinnamate, octadecyl-3(3.5-di-tert.butyl-4-hydroxyphenyl)propionate, pentaerythritol tetrakis(3(3.5-di-tert.butyl-4-hydroxyphenyl)propionate), phosphites and phosphonites such as tris(2,4-di-tert-butylphenyl)phosphite and thio compounds such as dilauryl thiodipropionate, dimyristyl thiodipropionate, and distearyl thiodipropionate, potassium iodide, cuprous iodide, various siloxanes, and amines such as polymerized 2,2,4-trimethyl-1,2-dihydroquinoline and the like, or a combination containing at least one of the foregoing.

Examples of flame retardants include, but are not limited to, halogenated flame retardants, like tetrabromo bisphenol A oligomers such as BC58 and BC52, brominated polystyrene or poly(dibromo-styrene), brominated epoxies, pentabromobenzyl acrylate polymer, ethylene-bis(tetrabromophthalimide, bis(pentabromobenzyl)ethane, $Al(OH)_3$, phosphor based FR systems like red phosphorus, metal phosphinates, expandable graphites, sodium or potassium perfluorobutane sulfate, sodium or potassium perfluorooctane sulfate, sodium or potassium diphenylsulfone sulfonate and sodium- or potassium-2,4,6-trichlorobenzoate, or a combination containing at least one of the foregoing.

In another aspect, the inventive polycarbonate composition can comprise a filler, such as, for example, an inorganic filler or reinforcing agent. The specific composition of a filler, if present, can vary, provided that the filler is chemically compatible with the remaining components of the polycarbonate composition. In one aspect, the polycarbonate composition comprises a filler, such as, for example, talc. If present, the amount of filler can comprise any amount suitable for a polycarbonate composition that does not adversely affect the desired properties thereof. In one aspect, the inventive polycarbonate comprises about 1 wt. % to about 10 wt. % of a filler.

In another aspect, a filler can comprise silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate), or the like; talc, including fibrous, modular, needle shaped, lamellar talc, or the like; wollastonite; surface-treated wollastonite; glass spheres such as hollow and solid glass spheres, silicate spheres, aluminosilicate, or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers), carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), aromatic polyamides, aromatic polyimides, polyetherimides, polytetrafluoroethylene, or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

In one aspect, a filler, if present, can be coated with a layer of metallic material to facilitate conductivity, or surface treated with silanes to improve adhesion and dispersion with the polymeric matrix resin. In addition, the reinforcing fillers can be provided in the form of monofilament or multifilament fibers and can be used individually or in combination with other types of fiber, through, for example, co-weaving or core/sheath, side-by-side, orange-type or matrix and fibril constructions, or by other methods known to one skilled in the art of fiber manufacture. Exemplary co-woven structures include, for example, glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids.

Manufacture of Blended Polycarbonate Compositions

In various aspects, the blended polycarbonate compositions of the present invention can be manufactured by various methods. The compositions of the present invention can be blended with the aforementioned ingredients by a variety of methods involving intimate admixing of the materials with any additional additives desired in the formulation. Because of the availability of melt blending equipment in commercial polymer processing facilities, melt processing methods can be used. In various further aspects, the equipment used in such melt processing methods includes, but is not limited to, the following: co-rotating and counter-rotating extruders, single screw extruders, co-kneaders, disc-pack processors and various other types of extrusion equipment. In a further aspect, the extruder is a twin-screw extruder. In various further aspects, the melt processed composition exits processing equipment such as an extruder through small exit holes in a die. The resulting strands of molten resin are cooled by passing the strands through a water bath. The cooled strands can be chopped into small pellets for packaging and further handling.

The temperature of the melt is minimized in order to avoid excessive degradation of the resins. For example, it can be desirable to maintain the melt temperature between about 230° C. and about 350° C. in the molten resin composition, although higher temperatures can be used provided that the residence time of the resin in the processing equipment is kept short. In a still further aspect, the extruder is typically operated at a temperature of about 180° C. to about 385° C. In a yet further aspect, the extruder is typically operated at a temperature of about 200° C. to about 330° C. In an even further aspect, the extruder is typically operated at a temperature of about 220° C. to about 300° C.

In various aspects, the blended polycarbonate compositions of the present invention can be prepared by blending the polycarbonate polymer composition, the impact modifier composition, and the SAN copolymer components in mixer, e.g. a HENSCHEL-Mixer® high speed mixer or other suitable mixer/blender. Other low shear processes, including but not limited to hand mixing, can also accomplish this blending. The mixture can then be fed into the throat of a twin-screw extruder via a hopper. Alternatively, at least one of the components can be incorporated into the composition by feeding directly into the extruder at the throat and/or downstream through a sidestuffer. Additives can also be compounded into a masterbatch desired polymeric resin and fed into the extruder. The extruder generally operated at a temperature higher than that necessary to cause the composition to flow. The extrudate is immediately quenched in a water bath and pelletized. The pellets, so prepared, when cutting the extrudate can be one-fourth inch long or less as desired. Such pellets can be used for subsequent molding, shaping, or forming.

Articles

The disclosed blended polycarbonate compositions can be formed into useful shaped articles by a variety of means such as; injection molding, extrusion, rotational molding, compression molding, blow molding, sheet or film extrusion, profile extrusion, gas assist molding, structural foam molding and thermoforming. The blended polycarbonate compositions described herein resins can also be made into film and sheet as well as components of laminate systems. In a further aspect, in an embodiment, a method of manufacturing an article comprises melt blending the polycarbonate polymer composition, the impact modifier composition, and the SAN copolymer components; and molding the extruded composition into an article. In a still further aspect, the extruding is done with a twin-screw extruder.

Formed articles include, for example, computer and business machine housings, home appliances, trays, plates, handles, helmets, automotive parts such as instrument panels, cup holders, glove boxes, interior coverings and the like. In various further aspects, formed articles include, but are not limited to, food service items, medical devices, animal cages, electrical connectors, enclosures for electrical equipment, electric motor parts, power distribution equipment, communication equipment, computers and the like, including devices that have molded in snap fit connectors. In a further aspect, articles of the present invention comprise exterior body panels and parts for outdoor vehicles and devices including automobiles, protected graphics such as signs, outdoor enclosures such as telecommunication and electrical connection boxes, and construction applications such as roof sections, wall panels and glazing. Multilayer articles made of the disclosed polycarbonates particularly include articles which will be exposed to UV-light, whether natural or artificial, during their lifetimes, and most particularly outdoor articles; i.e., those intended for outdoor use. Suitable articles are exemplified by enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; lap-top computer housings; palm-held computer housings; monitor housings; printer housings; keyboards; facsimile machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications.

In one aspect, the present invention pertains to articles comprising the disclosed blended polycarbonate compositions. In a further aspect, the article comprising the disclosed blended polycarbonate compositions is used in automotive applications. In a yet further aspect, the article used in automotive applications is selected from instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards.

Without further elaboration, it is believed that one skilled in the art can, using the description herein, utilize the present invention. The following examples are included to provide addition guidance to those skilled in the art of practicing the claimed invention. The examples provided are merely representative of the work and contribute to the teaching of the present invention. Accordingly, these examples are not intended to limit the invention in any manner.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein may be different from the actual publication dates, which can require independent confirmation.

Examples

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

The materials shown in Table 1 were used to prepare the compositions described herein. Batches were prepared of the Reference Blend and Sample Blends as shown in Table 2. The components (amounts expressed in percent weight, based on the total weight of the polymer composition) shown in Table 2 were subjected to dry mixing, fed into a D25 Twin Screw Extruder, and mixed with a nominal melt temperature of 260° C. under vacuum and a screw rotation rate of 300 rotations per minute (rpm).

TABLE I

| Abbreviation | Description | Source |
| --- | --- | --- |
| PC1 | BPA polycarbonate resin made by a melt process with an MVR at 300° C./1.2 kg, of about 23.5 to about 28.5 g/10 min. | SABIC Innovative Plastics ("SABIC I.P.") |
| PC2 | BPA polycarbonate resin made by an interfacial process with MVR at 300° C./1.2 kg, of about 5.1 to about 6.9 g/10 min. | SABIC I.P. |

TABLE I-continued

| Abbreviation | Description | Source |
|---|---|---|
| PMMA | Polymethylmethacrylate | — |
| ABS | ABS 333; high graft rubber acrylonitrile-butadiene-styrene with a polybutadiene content of about 52%. | SABIC I.P. |
| PC/PDMS | Polysiloxane-polycarbonate copolymer comprising units derived from bisphenol A and Formula 10 wherein $M_n$ is methoxy, R is methyl, $R^2$ is propylene, and D has an average value of about 45 to 50. The copolymer had an absolute weight average molecular weight of about 30,000 Da, and a dimethylsiloxane content of about 20 wt %. | SABIC I.P. |
| FP | Flow promoter: Arkon ® P125; a fully hydrogenated low molecular weight hydrocarbon resin made from C5-C9 petroleum feedstock. | Arakawa Chemical, Inc. |
| MR | Plasticizer/mold release agent: PETS or pentaerythritol tetrastearate | — |
| AO 1 | Primary antioxidant (hindered phenol); 3-(3′,5′-di-tert-Butyl-4′-hydroxyphenyl)propionic acid stearyl ester (CAS 2082-79-3; e.g. IRGANOX ™ 1076) | CIBA |
| AO 2 | Secondary anti-oxidant: IRGAFOS ™ 168 (aryl phosphite) | CIBA |
| PLA | Polylactic acid polymer | SABIC I.P. |
| Iso ter PC | Isosorbide-bisphenol A polycarbonate-resorcinol terpolymer in the ratio of 50:25:25, respectively. | SABIC I.P. |

Notched Izod impact ("NII") was measured on 80×10×4 mm (length×width×thickness) impact bars at 23° C. according to ISO 180, using a 5.5 Joule pendulum, and is reported in kilojoules per meter squared ($kJ/m^2$).

Heat deflection temperature (HDT) was measured according to ISO 75 on 80×10×4 mm (length×width×thickness) injection molded bars.

Tensile properties were tested according to ISO 527 on 150×10×4×mm (length×width×thickness) injection molded bars at 23° C. with a crosshead speed of 5 mm/min.

Multiaxial impact was measured on injection molded 3.2 mm impact disks. Impact values are reported as maximum energy to failure in Joules (J) and % ductility. The impact velocity was 4.40 m/s and measurements were done at 23° C. The ISO 6603 test protocol was followed. The impact value is a good proxy for ductility.

Various polycarbonate blends were tested for impact strength, tensile strength, and modulus according to the procedures described above. Reference Blend represents the standard polycarbonate blend comprising polycarbonate PC1 and PC2 (see Table I above for description of blend components). Samples Blends 1-3 comprise blends where all or a portion of the polycarbonate components have been substituted with the Iso ter PC. Sample Blend 4 further replaces polymethylmethacrylate (PMMA) with poly lactic acid (PLA). Table 1 shows the wt % of each component based on the total weight of the composition blend (i.e. wt % for the total composition is 100%).

TABLE II

| # | Component | Reference Blend | Sample Blend 1 | Sample Blend 2 | Sample Blend 3 | Sample Blend 4 |
|---|---|---|---|---|---|---|
| 1 | PC1 | 46.3 | 8 | — | — | — |
| 2 | PC2 | 6.7 | 6.7 | 3.1 | — | — |
| 3 | PMMA | 21 | 21 | 21 | 21 | — |
| 4 | ABS | 14 | 14 | 14 | 14 | 14 |
| 5 | PC/PDMS | 7.5 | 7.5 | 7.5 | 7.5 | 7.5 |
| 6 | FP | 4 | 4 | 4 | — | — |
| 7 | MR | 0.3 | 0.3 | 0.3 | 0.3 | 0.3 |
| 8 | AO 1 | 0.1 | 0.4 | 0.4 | 0.4 | 0.4 |
| 9 | AO 2 | 0.1 | 0.1 | 0.1 | 0.1 | 0.1 |
| 10 | PLA | — | — | — | — | 21 |
| 11 | Iso ter PC | — | 38 | 49.6 | 56.7 | 56.7 |
| | TOTAL | 100 | 100 | 100 | 100 | 100 |

The PC1 polycarbonate resin is ductile (e.g. the Notched Izod Impact or "NII" score of 56.69 $kJ/m^2$) whereas both PLA and the Iso ter PC are brittle (e.g. the NII score for Iso ter PC alone is 5.27 $kJ/m^2$). The data Table III compares the properties of the Reference Blend to with the Sample Blends comprising replacement of the PC1 with varied amounts of Iso ter PC (Sample Blends 1-3). Surprisingly, replacement of the ductile PC1 with a more brittle polycarbonate such as Iso ter PC increased impact energy, modulus, and tensile strength. At room temperature, the NII score increased from 36.4 $kJ/m^2$ for the Reference Blend to 84.2, 65.9, and 47.6 $kJ/m^2$ for Sample Blends 2, 3, and 4, respectively. The increase in NII was maintained at low temperatures. Additionally, tensile modulus increased from 2054 MPa in the comparator sample blend to 2147, 2194, and 265 MPa in Sample Blends 1, 2, and 3, respectively. Similarly, tensile strength showed a increase. For example, the data show an increase of at least 3 MPa when moving from the Reference Blend sample with a tensile strength of 48.0 MPa to samples 1, 2, and 3 which had tensile strengths of 51.7, 52.9, and 57.5 MPa, respectively. A similar increase was observed for the multi-axial impact strength ("MAI"). For example, the MAI score was 67.8 J for the comparator blend (Reference Blend) compared to 83.0, 96.5, and 101.0 J for Sample Blends 1, 2, and 3, respectively.

Moreover, further replacing PMMA with the even more brittle PLA (Sample Blend 4), also provided an unexpected and surprising increase in impact energy and modulus (e.g. compare Sample Blends 3 and 4). The data show that substituting the PMMA in Sample Blend 3 with PLA in Sample Blend 4 resulted in an increase in NII at room temperature from 47.6 $kJ/m^2$ to 61.7 $kJ/m^2$, and tensile modulus increased from 2365 MPa to 2407 MPa. The change in MAI was more modest, with an MAI of 101.0 J for Sample Blend 3 compared to 102.2 J for Sample Blend 4.

TABLE III

| Component | Reference Blend | Sample Blend 1 | Sample Blend 2 | Sample Blend 3 | Sample Blend 4 |
|---|---|---|---|---|---|
| NII RT (kJ/m2) | 36.4 | 84.2 | 65.9 | 47.6 | 61.7 |
| NII 0C (kJ/m2) | 28.7 | 64.2 | 51.3 | 39 | 59.1 |
| HDT (C) | 95.9 | 97.1 | 97.3 | 100.9 | 92.3 |
| Tens Mod (MPa) | 2054 | 2147 | 2194 | 2365 | 2407 |
| Tens Str (MPa) | 48.0 | 51.7 | 52.9 | 57.5 | 53.2 |
| MAI 4.4 m/s (J) | 67.8 | 83.0 | 96.5 | 101.0 | 102.2 |

Accordingly, substitution of a polycarbonate with a more brittle terpolymer and/or substituting PMMA with a more brittle PLA had the surprising effect of providing a polycarbonate blend with improved ductility rather than a more brittle polycarbonate blend.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A polycarbonate composition comprising:
   a) from about 35 wt % to about 60 wt % of a first polycarbonate component, wherein the first polycarbonate component comprises a polycarbonate terpolymer comprising monomer units of isosorbide, bisphenol A, and resorcinol;
   b) from greater than 0 wt % to about 20 wt % of a second polycarbonate component, wherein the second polycarbonate component comprises a polycarbonate polymer comprising monomer units of bisphenol A;
   c) from greater than 0 wt % to about 10 wt % of a third polycarbonate component, wherein the third polycarbonate component comprises a polycarbonate homopolymer of bisphenol A;
   d) from about 10 wt % to about 17 wt % of an acrylonitrile-butadiene-styrene (ABS) copolymer; and
   e) about 15 wt % to about 25 wt % of polymethylmethacrylate (PMMA).

2. The composition of claim 1, wherein the first polycarbonate component is present in the composition in an amount of about 38 wt % of the composition.

3. The composition of claim 1, wherein the first polycarbonate component comprises
   a) about 50 mol % of isosorbide monomer units;
   b) about 25 mol % of resorcinol monomer units;
   c) about 25 mol % of bisphenol A monomer units; and
   d) wherein the mol % of isosorbide monomer units, resorcinol monomer units, and bisphenol A monomer units combined is 100 mol %.

4. The composition of claim 1, wherein the second polycarbonate component is present in an amount of from greater than 0 wt % to about 8 wt % of the composition.

5. The composition of claim 1, wherein the second polycarbonate component is present in an amount of about 8 wt % of the composition.

6. The composition of claim 1, wherein the third polycarbonate component is present in an amount of about 6.7 wt % of the composition.

7. The composition of claim 1, wherein the third polycarbonate component has a melt volume flow rate of about 5.0 to about 10 g/10 min. as measured at 300° C. under a load of 1.2 kg.

8. The composition of claim 1, wherein the third polycarbonate component has a melt volume flow rate of about 5.1 to about 6.9 g/10 min. as measured at 300° C. under a load of 1.2 kg.

9. The composition of claim 1, wherein the ABS copolymer is present in an amount of about 14 wt % of the composition.

10. The composition of claim 1, wherein the ABS copolymer has a polybutadiene content of about 40 wt % to about 80 wt %.

11. The composition of claim 1, wherein the ABS copolymer comprises about 10 wt % to about 17 wt % of the composition.

12. The composition of claim 1, wherein the PMMA comprises about 21 wt % of the composition.

13. The composition of claim 1, wherein the composition further comprises a polylactic acid ("PLA").

14. The composition of claim 13, wherein the PMMA and PLA combined comprises about 15 wt % to about 25 wt % of the composition.

15. The composition of claim 1, wherein the composition further comprises a polycarbonate-polysiloxane copolymer.

16. The composition of claim 15, wherein the polycarbonate-polysiloxane copolymer is present in an amount from about 5 wt % to about 10 wt %.

17. The composition of claim 1, wherein the composition further comprises one or more additional components selected from a flow promoter, a plasticizer or mold release agent, a primary antioxidant, and a secondary antioxidant.

18. The composition of claim 17, wherein the primary antioxidant is a 3-(3',5'-di-tert-Butyl-4'-hydroxyphenyl)propionic acid stearyl ester.

19. The composition of claim 17, wherein the secondary antioxidant is tris(2,4-di-tert-butylphenyl)phosphite.

20. The composition of claim 17, wherein the flow promoter is a low molecular weight hydrocarbon resin made from C5-C9 petroleum feedstock and is fully hydrogenated.

21. The composition of claim 17, wherein the plasticizer or mold release agent is pentarythritol tetrastearate.

22. The composition of claim 1, wherein the composition has a Notched Izod Impact strength of at least about 60 kJ/m$^2$.

23. A polycarbonate composition comprising:
   a) about 38 wt % of a first polycarbonate component; wherein the first polycarbonate component is isosorbide-resorcinol-bisphenol A polycarbonate terpolymer;
   b) about 8 wt % of an optional second polycarbonate component;
   c) about 6.7 wt % of a third polycarbonate component; wherein the third polycarbonate is a low-flow polycarbonate comprising monomer units of bisphenol A;
   d) about 14 wt % of an ABS copolymer; and
   e) about 21 wt % of a PMMA copolymer.

24. A polycarbonate composition comprising:
   a) about 49.6 wt % of a first polycarbonate component; wherein the first polycarbonate component is isosorbide-resorcinol-bisphenol A polycarbonate terpolymer;
   b) about 3.1 wt % of a second polycarbonate component; wherein the second polycarbonate is a low-flow polycarbonate comprising monomer units of bisphenol A;
   c) about 14 wt % of an ABS copolymer; and
   d) about 21 wt % of a PMMA copolymer.

25. A polycarbonate composition comprising:
   a) about 56.7 wt % of a first polycarbonate component, wherein the first polycarbonate component comprises a polycarbonate terpolymer comprising monomer units of isosorbide, bisphenol A, and resorcinol;
   b) about 14 wt % of an ABS copolymer; and
   c) about 21 wt % of a PMMA copolymer.

26. A polycarbonate composition comprising:
   a) about 56.7 wt % of a first polycarbonate component; wherein the first polycarbonate component is a isosorbide-resorcinol-bisphenol A polycarbonate terpolymer;
   b) about 14% wt acrylonitrile-butadiene-styrene; and
   c) about 21% wt polylactic acid.

27. A polycarbonate composition, comprising:
   a) a polycarbonate component comprising an isosorbide/resorcinol/bisphenol-A polycarbonate terpolymer, wherein the isosorbide/resorcinol/bisphenol-A polycarbonate terpolymer has a respective molar weight ratio of about 50(isosorbide)/25(resorcinol)/25(bisphenol-A), and wherein the isosorbide/resorcinol/bisphenol-A polycarbonate terpolymer is present in the composition in an amount from greater than 35 wt % to about 60 wt % of the composition;
b) from greater than 0 wt % to about 20 wt % of a second polycarbonate component, wherein the second polycarbonate component comprises a polycarbonate polymer comprising monomer units of bisphenol A;
c) from greater than 0 wt % to about 10 wt % of a third polycarbonate component, wherein the third polycarbonate component comprises a polycarbonate homopolymer of bisphenol A;
d) from about 10 wt % to about 17 wt % of an acrylonitrile-butadiene-styrene polymer; and
e) from about 15 wt % to about 25 wt % of a polylactic acid (PLA).

28. A method of forming a polycarbonate composition comprising combining:
a) from about 35 wt % to about 60 wt % of a polycarbonate component comprising an isosorbide/resorcinol/bisphenol-A polycarbonate terpolymer, wherein the isosorbide/resorcinol/bisphenol-A polycarbonate terpolymer has a respective molar weight ratio of about 50(isosorbide)/25(resorcinol)/25(bisphenol-A);
b) from greater than 0 wt % to about 20 wt % of a second polycarbonate component, wherein the second polycarbonate component comprises a polycarbonate polymer comprising monomer units of bisphenol A;
c) from greater than 0 wt % to about 10 wt % of a third polycarbonate component, wherein the third polycarbonate component comprises a polycarbonate homopolymer of bisphenol A;
d) from about 10 wt % to about 17 wt % of an acrylonitrile-butadiene-styrene polymer; and
e) from about 15 wt % to about 25 wt % of a polylactic acid.

29. The method of claim 28, wherein the polycarbonate composition further comprises PMMA.

* * * * *